(12) United States Patent
Park et al.

(10) Patent No.: US 9,715,529 B2
(45) Date of Patent: *Jul. 25, 2017

(54) HYBRID EXECUTION OF CONTINUOUS AND SCHEDULED QUERIES

(71) Applicant: Oracle International Corporation, Redwood Shores, CA (US)

(72) Inventors: Hoyong Park, San Jose, CA (US); Anand Srinivasan, Bangalore (IN); Vikram Shukla, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/003,646

(22) Filed: Jan. 21, 2016

(65) Prior Publication Data

US 2016/0140180 A1    May 19, 2016

Related U.S. Application Data

(63) Continuation of application No. 13/828,640, filed on Mar. 14, 2013, now Pat. No. 9,286,352.

(Continued)

(51) Int. Cl.
*G06F 7/00* (2006.01)
*G06F 17/30* (2006.01)

(52) U.S. Cl.
CPC .. *G06F 17/30516* (2013.01); *G06F 17/30389* (2013.01); *G06F 17/30424* (2013.01);

(Continued)

(58) Field of Classification Search
CPC .............. G06Q 30/02; G06F 17/30548; G06F 17/30483; G06F 17/30516; G06F 17/30554; G06F 17/30557; G06F 17/30442

(Continued)

(56) References Cited

U.S. PATENT DOCUMENTS

| 4,996,687 A | 2/1991 | Hess et al. |
| 5,051,947 A | 9/1991 | Messenger et al. |

(Continued)

FOREIGN PATENT DOCUMENTS

| CN | 101866353 | 10/2010 |
| CN | 102135984 | 7/2011 |

(Continued)

OTHER PUBLICATIONS

Bestehorn Fault-tolerant query processing in structured P2P-systems, Springer Science+Business Media LLC Distrib Parallel Databases 28:33-66 (May 8, 2010).

(Continued)

*Primary Examiner* — Md. I Uddin
(74) *Attorney, Agent, or Firm* — Kilpatrick Townsend & Stockton LLP

(57) ABSTRACT

Techniques for implementing the hybrid execution of continuous and scheduled queries are provided. In some examples, a query engine may be initialized with relational data from at least a first source. For example, the first source may include a database or other system that can provide historical data. Additionally, the query engine may be enabled to provide query results based at least in part on the relational data from at least the first source and streaming data from at least a second source. In some examples, the second source may be a data stream.

19 Claims, 12 Drawing Sheets

Related U.S. Application Data

(60) Provisional application No. 61/707,641, filed on Sep. 28, 2012.

(52) U.S. Cl.
CPC .. *G06F 17/30442* (2013.01); *G06F 17/30451* (2013.01); *G06F 17/30457* (2013.01); *G06F 17/30477* (2013.01); *G06F 17/30483* (2013.01); *G06F 17/30498* (2013.01); *G06F 17/30548* (2013.01); *G06F 17/30551* (2013.01); *G06F 17/30554* (2013.01); *G06F 17/30557* (2013.01); *G06F 17/30616* (2013.01); *G06F 17/30864* (2013.01); *G06F 17/30958* (2013.01)

(58) Field of Classification Search
USPC .......................... 707/713, 759, 769, 706, 718
See application file for complete search history.

(56) References Cited

U.S. PATENT DOCUMENTS

| | | |
|---|---|---|
| 5,339,392 A | 8/1994 | Risberg et al. |
| 5,495,600 A | 2/1996 | Terry et al. |
| 5,706,494 A | 1/1998 | Cochrane et al. |
| 5,802,262 A | 9/1998 | Van De Vanter |
| 5,802,523 A | 9/1998 | Jasuja et al. |
| 5,822,750 A | 10/1998 | Jou et al. |
| 5,826,077 A | 10/1998 | Blakeley et al. |
| 5,850,544 A | 12/1998 | Parvathaneny et al. |
| 5,857,182 A | 1/1999 | Demichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas et al. |
| 6,006,235 A | 12/1999 | Macdonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,212,673 B1 | 4/2001 | House et al. |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray et al. |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,633,867 B1 | 10/2003 | Kraft et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,904,019 B2 | 6/2005 | Heinen et al. |
| 6,985,904 B1 | 1/2006 | Kaluskar et al. |
| 6,986,019 B1 | 1/2006 | Bagashev et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,284,041 B2 | 10/2007 | Nakatani et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,348,981 B1 | 3/2008 | Buck |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,440,461 B2 | 10/2008 | Sahita et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,526,804 B2 | 4/2009 | Shelest et al. |
| 7,533,087 B2 | 5/2009 | Liu et al. |
| 7,546,284 B1 | 6/2009 | Martinez et al. |
| 7,552,365 B1 | 6/2009 | Marsh et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce et al. |
| 7,634,501 B2 | 12/2009 | Yabloko |
| 7,636,703 B2 | 12/2009 | Taylor et al. |
| 7,644,066 B2 | 1/2010 | Krishnaprasad et al. |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chkodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,818,313 B1 | 10/2010 | Tsimelzon |
| 7,823,066 B1 | 10/2010 | Kuramura |
| 7,827,146 B1 | 11/2010 | De Landstheer et al. |
| 7,827,190 B2 | 11/2010 | Pandya et al. |
| 7,844,829 B2 | 11/2010 | Meenakshisundaram |
| 7,870,124 B2 | 1/2011 | Liu et al. |
| 7,870,167 B2 | 1/2011 | Lu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | Maclennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |

(56) References Cited

U.S. PATENT DOCUMENTS

| | | |
|---|---|---|
| 7,984,043 B1 | 7/2011 | Waas |
| 7,987,204 B2 | 7/2011 | Stokes |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,065,319 B2 | 11/2011 | Ding et al. |
| 8,073,826 B2 | 12/2011 | Srinivasan et al. |
| 8,099,400 B2 | 1/2012 | Haub et al. |
| 8,103,655 B2 | 1/2012 | Srinivasan et al. |
| 8,122,006 B2 | 2/2012 | De Castro Alves et al. |
| 8,134,184 B2 | 3/2012 | Becker et al. |
| 8,145,686 B2 | 3/2012 | Raman et al. |
| 8,145,859 B2 | 3/2012 | Park et al. |
| 8,155,880 B2 | 4/2012 | Patel et al. |
| 8,190,738 B2 | 5/2012 | Ruehle |
| 8,195,648 B2 | 6/2012 | Zabback et al. |
| 8,204,873 B2 | 6/2012 | Chavan |
| 8,204,875 B2 | 6/2012 | Srinivasan et al. |
| 8,260,803 B2 | 9/2012 | Hsu et al. |
| 8,290,776 B2 | 10/2012 | Moriwaki et al. |
| 8,296,316 B2 | 10/2012 | Jain et al. |
| 8,307,197 B2 | 11/2012 | Koch, III |
| 8,307,343 B2 | 11/2012 | Chaudhuri et al. |
| 8,315,990 B2 | 11/2012 | Barga et al. |
| 8,316,012 B2 | 11/2012 | Abouzied et al. |
| 8,321,450 B2 | 11/2012 | Thatte et al. |
| 8,346,511 B2 | 1/2013 | Schoning et al. |
| 8,352,517 B2 | 1/2013 | Park et al. |
| 8,370,812 B2 | 2/2013 | Feblowitz et al. |
| 8,386,466 B2 | 2/2013 | Park et al. |
| 8,387,076 B2 | 2/2013 | Thatte et al. |
| 8,392,402 B2 | 3/2013 | Mihaila et al. |
| 8,396,886 B1 | 3/2013 | Tsimelzon |
| 8,447,739 B2 | 5/2013 | Naibo et al. |
| 8,447,744 B2 | 5/2013 | Alves et al. |
| 8,458,175 B2 | 6/2013 | Stokes |
| 8,484,243 B2 | 7/2013 | Krishnamurthy et al. |
| 8,498,956 B2 | 7/2013 | Srinivasan et al. |
| 8,521,867 B2 | 8/2013 | Srinivasan et al. |
| 8,527,458 B2 | 9/2013 | Park et al. |
| 8,543,558 B2 | 9/2013 | Srinivasan et al. |
| 8,572,589 B2 | 10/2013 | Cataldo et al. |
| 8,589,436 B2 | 11/2013 | Srinivasan et al. |
| 8,595,840 B1 | 11/2013 | Malibiran et al. |
| 8,676,841 B2 | 3/2014 | Srinivasan et al. |
| 8,713,049 B2 | 4/2014 | Jain et al. |
| 8,719,207 B2 | 5/2014 | Ratnam et al. |
| 8,745,070 B2 | 6/2014 | Krishnamurthy |
| 8,762,369 B2 | 6/2014 | Macho et al. |
| 8,775,412 B2 | 7/2014 | Day et al. |
| 8,935,293 B2 | 1/2015 | Park et al. |
| 8,959,106 B2 | 2/2015 | De Castro Alves et al. |
| 8,990,416 B2 | 3/2015 | Shukla et al. |
| 9,015,102 B2 | 4/2015 | van Lunteren |
| 9,047,249 B2 | 6/2015 | de Castro Alves et al. |
| 9,058,360 B2 | 6/2015 | De Castro Alves et al. |
| 9,098,587 B2 | 8/2015 | Deshmukh et al. |
| 9,110,945 B2 | 8/2015 | Jain |
| 9,189,280 B2 | 11/2015 | Park et al. |
| 9,244,978 B2 | 1/2016 | Alves et al. |
| 9,256,646 B2 | 2/2016 | Deshmukh et al. |
| 9,262,258 B2 | 2/2016 | Alves et al. |
| 9,262,479 B2 | 2/2016 | Deshmukh et al. |
| 9,286,352 B2 | 3/2016 | Park et al. |
| 9,292,574 B2 | 3/2016 | Hsiao et al. |
| 9,305,057 B2 | 4/2016 | De Castro Alves et al. |
| 9,305,238 B2 | 4/2016 | Srinivasan et al. |
| 9,329,975 B2 | 5/2016 | Park et al. |
| 9,361,308 B2 | 6/2016 | Deshmukh et al. |
| 9,390,135 B2 | 7/2016 | Alves et al. |
| 9,418,113 B2 | 8/2016 | Bishnoi et al. |
| 9,430,494 B2 | 8/2016 | Park et al. |
| 9,535,761 B2 | 1/2017 | Park et al. |
| 9,563,663 B2 | 2/2017 | Shukla et al. |
| 2002/0023211 A1 | 2/2002 | Roth et al. |
| 2002/0032804 A1 | 3/2002 | Hunt |
| 2002/0038306 A1 | 3/2002 | Griffin et al. |
| 2002/0038313 A1 | 3/2002 | Klein et al. |
| 2002/0049788 A1 | 4/2002 | Lipkin et al. |
| 2002/0056004 A1 | 5/2002 | Smith et al. |
| 2002/0073399 A1 | 6/2002 | Golden |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0014408 A1 | 1/2003 | Robertson |
| 2003/0037048 A1 | 2/2003 | Kabra et al. |
| 2003/0046673 A1 | 3/2003 | Copeland et al. |
| 2003/0065655 A1 | 4/2003 | Syeda-mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0212664 A1 | 11/2003 | Breining et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0243590 A1 | 12/2004 | Gu et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0027698 A1 | 2/2005 | Collet et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0108368 A1 | 5/2005 | Mohan |
| 2005/0120016 A1 | 6/2005 | Midgley |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0192921 A1 | 9/2005 | Chaudhuri et al. |
| 2005/0204340 A1 | 9/2005 | Ruminer et al. |
| 2005/0229158 A1 | 10/2005 | Thusoo et al. |
| 2005/0273352 A1 | 12/2005 | Moffat et al. |
| 2005/0273450 A1 | 12/2005 | McMillen et al. |
| 2005/0289125 A1 | 12/2005 | Liu et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100957 A1 | 5/2006 | Buttler et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0155719 A1 | 7/2006 | Mihaeli et al. |
| 2006/0166704 A1 | 7/2006 | Benco et al. |
| 2006/0167704 A1 | 7/2006 | Nicholls et al. |
| 2006/0167856 A1 | 7/2006 | Angele et al. |
| 2006/0167869 A1* | 7/2006 | Jones ............... G06F 17/30929 |

(56) References Cited

U.S. PATENT DOCUMENTS

| | | |
|---|---|---|
| 2006/0212441 A1 | 9/2006 | Tang et al. |
| 2006/0224576 A1 | 10/2006 | Liu et al. |
| 2006/0230029 A1* | 10/2006 | Yan .................... G06Q 30/02 |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1 | 3/2007 | Von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156787 A1 | 7/2007 | MacGregor |
| 2007/0156964 A1 | 7/2007 | Sistla |
| 2007/0192301 A1 | 8/2007 | Posner |
| 2007/0198479 A1 | 8/2007 | Cai et al. |
| 2007/0214171 A1 | 9/2007 | Behnen |
| 2007/0226188 A1 | 9/2007 | Johnson et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | McGoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0110397 A1 | 5/2008 | Son |
| 2008/0114787 A1 | 5/2008 | Kashiyama et al. |
| 2008/0120283 A1 | 5/2008 | Liu et al. |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0275891 A1 | 11/2008 | Park et al. |
| 2008/0281782 A1 | 11/2008 | Agrawal |
| 2008/0301086 A1 | 12/2008 | Gupta |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2008/0313131 A1 | 12/2008 | Friedman et al. |
| 2009/0006320 A1 | 1/2009 | Ding et al. |
| 2009/0006346 A1 | 1/2009 | Kanthi et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112779 A1 | 4/2009 | Wolf et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0125916 A1 | 5/2009 | Lu et al. |
| 2009/0132503 A1 | 5/2009 | Sun |
| 2009/0133041 A1 | 5/2009 | Rahman et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0192981 A1 | 7/2009 | Papaemmanouil et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0282021 A1 | 11/2009 | Bennet et al. |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo |
| 2009/0319501 A1 | 12/2009 | Goldstein et al. |
| 2009/0327102 A1 | 12/2009 | Maniar et al. |
| 2009/0327257 A1 | 12/2009 | Abouzeid et al. |
| 2010/0017379 A1 | 1/2010 | Naibo et al. |
| 2010/0017380 A1 | 1/2010 | Naibo et al. |
| 2010/0022627 A1 | 1/2010 | Scherer et al. |
| 2010/0023498 A1 | 1/2010 | Dettinger et al. |
| 2010/0036803 A1 | 2/2010 | Vemuri et al. |
| 2010/0036831 A1 | 2/2010 | Vemuri |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106710 A1 | 4/2010 | Nishizawa |
| 2010/0106946 A1 | 4/2010 | Imaki et al. |
| 2010/0125572 A1 | 5/2010 | Poblete et al. |
| 2010/0125574 A1 | 5/2010 | Navas |
| 2010/0125584 A1 | 5/2010 | Navas |
| 2010/0138405 A1 | 6/2010 | Mihaila |
| 2010/0161589 A1 | 6/2010 | Nica et al. |
| 2010/0223283 A1 | 9/2010 | Lee et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0250572 A1 | 9/2010 | Chen et al. |
| 2010/0293135 A1 | 11/2010 | Candea et al. |
| 2010/0312756 A1 | 12/2010 | Zhang et al. |
| 2010/0318652 A1 | 12/2010 | Samba |
| 2010/0332401 A1 | 12/2010 | Prahlad et al. |
| 2011/0004621 A1 | 1/2011 | Kelley et al. |
| 2011/0016160 A1 | 1/2011 | Zhang et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0035253 A1 | 2/2011 | Mason et al. |
| 2011/0040746 A1 | 2/2011 | Handa et al. |
| 2011/0055192 A1 | 3/2011 | Tang et al. |
| 2011/0055197 A1 | 3/2011 | Chavan |

(56) References Cited

U.S. PATENT DOCUMENTS

| | | |
|---|---|---|
| 2011/0084967 A1 | 4/2011 | De Pauw et al. |
| 2011/0093162 A1 | 4/2011 | Nielsen et al. |
| 2011/0093491 A1 | 4/2011 | Zabback et al. |
| 2011/0105857 A1 | 5/2011 | Zhang et al. |
| 2011/0131588 A1 | 6/2011 | Allam et al. |
| 2011/0161321 A1 | 6/2011 | De Castro et al. |
| 2011/0161328 A1 | 6/2011 | Park et al. |
| 2011/0161352 A1 | 6/2011 | De Castro et al. |
| 2011/0161356 A1 | 6/2011 | De Castro et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0178775 A1 | 7/2011 | Schoning et al. |
| 2011/0196839 A1 | 8/2011 | Smith et al. |
| 2011/0196891 A1 | 8/2011 | De Castro et al. |
| 2011/0246445 A1 | 10/2011 | Mishra |
| 2011/0270879 A1 | 11/2011 | Srinivasan et al. |
| 2011/0282812 A1 | 11/2011 | Chandramouli et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1 | 12/2011 | Mejdrich et al. |
| 2012/0016866 A1 | 1/2012 | Dunagan |
| 2012/0041934 A1 | 2/2012 | Srinivasan et al. |
| 2012/0072455 A1 | 3/2012 | Jain et al. |
| 2012/0116982 A1 | 5/2012 | Yoshida et al. |
| 2012/0124096 A1 | 5/2012 | Krishnamurthy et al. |
| 2012/0130963 A1 | 5/2012 | Luo et al. |
| 2012/0131139 A1 | 5/2012 | Siripurapu et al. |
| 2012/0166417 A1 | 6/2012 | Chandramouli et al. |
| 2012/0166421 A1 | 6/2012 | Cammert et al. |
| 2012/0166469 A1 | 6/2012 | Cammert et al. |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290715 A1 | 11/2012 | Dinger et al. |
| 2012/0291049 A1 | 11/2012 | Park et al. |
| 2012/0324453 A1 | 12/2012 | Chandramouli et al. |
| 2013/0014088 A1 | 1/2013 | Park et al. |
| 2013/0031567 A1 | 1/2013 | Nano et al. |
| 2013/0046725 A1 | 2/2013 | Cammert et al. |
| 2013/0117317 A1 | 5/2013 | Wolf |
| 2013/0144866 A1 | 6/2013 | Jerzak et al. |
| 2013/0191370 A1 | 7/2013 | Chen et al. |
| 2013/0191413 A1 | 7/2013 | Chen et al. |
| 2013/0262399 A1 | 10/2013 | Eker et al. |
| 2013/0275452 A1 | 10/2013 | Krishnamurthy et al. |
| 2013/0332240 A1 | 12/2013 | Patri et al. |
| 2014/0019194 A1 | 1/2014 | Anne et al. |
| 2014/0059109 A1 | 2/2014 | Jugel et al. |
| 2014/0082013 A1 | 3/2014 | Wolf et al. |
| 2014/0095425 A1 | 4/2014 | Sipple et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172506 A1 | 6/2014 | Parsell et al. |
| 2014/0172914 A1 | 6/2014 | Elnikety et al. |
| 2014/0201225 A1 | 7/2014 | Deshmukh et al. |
| 2014/0201355 A1 | 7/2014 | Bishnoi et al. |
| 2014/0236983 A1 | 8/2014 | de Castro Alves et al. |
| 2014/0237289 A1 | 8/2014 | de Castro Alves et al. |
| 2014/0324530 A1 | 10/2014 | Thompson et al. |
| 2014/0358959 A1 | 12/2014 | Bishnoi et al. |
| 2014/0379712 A1 | 12/2014 | Lafuente Alvarez |
| 2015/0007320 A1 | 1/2015 | Liu et al. |
| 2015/0156241 A1 | 6/2015 | Shukla et al. |
| 2015/0161214 A1 | 6/2015 | Kali et al. |
| 2015/0227415 A1 | 8/2015 | Alves et al. |
| 2015/0363464 A1 | 12/2015 | Alves et al. |
| 2015/0381712 A1 | 12/2015 | De Castro Alves et al. |
| 2016/0034311 A1 | 2/2016 | Park et al. |
| 2016/0085809 A1 | 3/2016 | De Castro et al. |
| 2016/0085810 A1 | 3/2016 | De Castro et al. |
| 2016/0103882 A1 | 4/2016 | Deshmukh et al. |
| 2016/0140180 A1 | 5/2016 | Park et al. |
| 2016/0154855 A1 | 6/2016 | Hsiao et al. |
| 2016/0283555 A1 | 9/2016 | Alves et al. |
| 2017/0024912 A1 | 1/2017 | De Castro et al. |
| 2017/0075726 A1 | 3/2017 | Park et al. |

FOREIGN PATENT DOCUMENTS

| | | |
|---|---|---|
| CN | 102665207 | 9/2012 |
| CN | 102892073 | 1/2013 |
| CN | 105074698 | 11/2015 |
| CN | 105308592 | 2/2016 |
| CN | 105379183 | 3/2016 |
| CN | 105593854 | 5/2016 |
| EP | 1241589 | 9/2002 |
| EP | 2474922 | 7/2012 |
| JP | 2002-251233 A | 9/2002 |
| JP | 2007-328716 A | 12/2007 |
| JP | 2008-541225 A | 11/2008 |
| JP | 2009-134689 A | 6/2009 |
| JP | 2010-108073 A | 5/2010 |
| JP | 2011-039818 A | 2/2011 |
| JP | 2016500168 | 1/2016 |
| JP | 2016503216 | 2/2016 |
| JP | 2016504679 | 2/2016 |
| WO | 0049533 | 8/2000 |
| WO | 0118712 | 3/2001 |
| WO | 0159602 | 8/2001 |
| WO | 0165418 | 9/2001 |
| WO | 03030031 | 4/2003 |
| WO | 2007122347 | 11/2007 |
| WO | WO2009/119811 A1 | 10/2009 |
| WO | 2012037511 | 3/2012 |
| WO | 2012050582 | 4/2012 |
| WO | 2012154408 | 11/2012 |
| WO | 2012158360 | 11/2012 |
| WO | 2014000819 | 1/2014 |
| WO | 2014052675 | 4/2014 |
| WO | 2014052677 | 4/2014 |
| WO | 2014052679 | 4/2014 |
| WO | 2014089190 | 6/2014 |
| WO | 2014113263 | 7/2014 |
| WO | 2014113273 | 7/2014 |
| WO | 2014130514 | 8/2014 |
| WO | 2014193943 | 12/2014 |
| WO | 2015085103 | 6/2015 |
| WO | 2016048912 | 3/2016 |

OTHER PUBLICATIONS

Cooperativesystems: "Combined WLAN and Inertial Indoor Pedestrian Positioning System" URL:https://www.youtube.com/watch?v=mEt88WaHZvU.

Frank et al "Development and Evaluation of a Combined WLAN & Inertial Indoor Pedestrian Positioning System" Proceedings of the $22_{nd}$ International Technical Meeting of the Satellite Division of the Institute of Navigation (ION GNSS 2009). (Sep. 25, 2009) pp. 538-546.

Kramer "Semantics and Implementation of Continuous Sliding Window Queries over Data Streams" ACM Transactions on Database Systems, vol. 34, pp. 4:1 to 4:49 (Apr. 2009).

(56) References Cited

OTHER PUBLICATIONS

Final Office Action for U.S. Appl. No. 13/830,428 dated May 26, 2016, 26 pages.
Final Office Action for U.S. Appl. No. 11/601,415 dated May 17, 2016, 17 pages.
Final Office Action for U.S. Appl. No. 14/036,659 dated Apr. 22, 2016, 38 pages.
Non-Final Office Action for U.S. Appl. No. 14/883,815 dated May 10, 2016, 32 pages.
Notice of Allowance for U.S. Appl. No. 12/949,081 dated May 3, 2016, 6 pages.
Final Office Action for U.S. Appl. No. 13/829,958 dated Jun. 30, 2016, 19 pages.
International Preliminary Report on Patentabiilty dated Jun. 16, 2016 for PCT/US2014/068641, 7 pages.
International Application No. PCT/RU2015/000468, International Search Report and Written Opinion mailed on Apr. 25, 2016, 9 pages.
International Application No. PCT/US2015/016346, International Search Report and Written Opinion mailed on May 24, 2016, 5 pages.
China Patent Office office action for patent application CN201180053021.4 (May 27, 2016).
Oracle Application Server 10g, Release 2 and 3, New Features Overview, an Oracle White Paper, Oracle, Oct. 2005, 48 pages.
Map Reduce, Wikipedia, The Free Encyclopedia, 2016, 11 pages.
OracleTM Complex Event Processing CQL Language Reference, 11g Release 1(11.1.1) E12048-03, Apr. 2010, pp. 18-1 to 18.9.5.
Pig (programming tool), Wikipedia, The Free Encyclopedia, 2016, 4 pages.
U.S. Appl. No. 12/396,464, Final Office Action mailed on Jan. 16, 2013, 17 pages.
U.S. Appl. No. 13/764,560, Notice of Allowance mailed on Sep. 30, 2016, 10 pages.
U.S. Appl. No. 13/827,631, Non-Final Office Action mailed on Feb. 11, 2016, 12 pages.
U.S. Appl. No. 13/830,502, Final Office Action mailed on Jul. 6, 2016, 28 pages.
U.S. Appl. No. 14/037,072, Notice of Allowance mailed on Feb. 16, 2016, 18 pages.
U.S. Appl. No. 14/079,538, Final Office Action mailed on Jul. 27, 2016, 28 pages.
U.S. Appl. No. 14/883,815, Notice of Allowance mailed on Aug. 30, 2016, 13 pages.
U.S. Appl. No. 13/827,631, Final Office Action mailed on Oct. 20, 2016, 12 pages.
European Application No. 12783063.6, Office Action mailed on Nov. 11, 2015, 8 pages.
Mahlke et al., Comparison of Full and Partial Predicated Execution Support for ILP Processors, ICSA '95, Santa Margherita Ligure, 1995, pp. 138-149.
Olston et al., Pig Latin, A Not-So-Foreign Language for Data Processing, 2008, 12 pages.
International Application No. PCT/US2015/016346, International Preliminary Report on Patentability mailed on Sep. 30, 2016, 6 pages.
International Application No. PCT/US2015/051268, Written Opinion mailed on Aug. 18, 2016, 7 pages.
Yang et al., Map-Reduce-Merge, Simplified Relational Data Processing on Large Clusters, 2007, 12 pages.
Final Office Action for U.S. Appl. 13/830,759 dated Feb. 18, 2016, 18 pages.
Japan Patent Office office actions JPO patent application JP2014-509315 (Mar. 15, 2016).
Notice of Allowance for U.S. Appl. No. 13/770,961 dated Apr. 4, 2016, 8 pages.
Final Office Action for U.S. Appl. No. 13/838,259 dated Feb. 19, 2016, 47 pages.
Notice of Allowance for U.S. Appl. No. 13/906,162 dated Apr. 5, 2016, 7 pages.
Final Office Action for U.S. Appl. No. 14/036,500 dated Mar. 17, 2016, 34 pages.
Final Office Action for U.S. Appl. No. 13/764,560 dated Apr. 14, 2016, 20 pages.
Final Office Action for U.S. Appl. No. 14/621,098 dated Apr. 21, 2016, 16 pages.
Yosuke Watanabe et al., Development of a Data Stream Integration System with a Multiple Query Optimizer, Journal articles of the 15th Data Engineering Workshop (DEWS2004), The Institute of Electronics, Information and Communication Engineers, Technical Committee on Data Engineering, Aug. 11, 2009, pp. 1-8.
Shuhei Kuwata et al., Stream Data Analysis Application for Customer Behavior with Complex Event Processing, IEICE Technical Report, The Institute of Electronics, Information and Communication Engineers, Jun. 21, 2010, vol. 110, No. 107, pp. 13-18.
Hiroyuki Kitagawa et al., Sensing Network, Information Processing, Information Processing Society of Japan, Sep. 15, 2010, vol. 51, No. 9, pp. 1119-1126.
Hirzel et al., "SPL Stream Processing Language Report", IBM Research Report RC24897 (W0911-044), IBM Research Division, Thomas J. Watson Research center, Yorktown Heights, NY, Nov. 5, 2009, 19 pages.
Final Office Action for U.S. Appl. No. 13/830,378 dated Nov. 5, 2015, 28 pages.
Non-Final Office Action for U.S. Appl. No. 13/830,378, dated Feb. 25, 2015, 23 pages.
Non-Final Office Action for U.S. Appl. No. 13/828,640 dated Dec. 2, 2014, 11 pages.
U.S. Appl. No. 13/828,640, Final Office Action mailed on Jun. 17, 2015, 11 pages.
Notice of Allowance for U.S. Appl. No. 13/828,640 dated Jan. 6, 2016, 16 pages.
China Patent Office office actions for patent application CN201280022008.7 (Dec. 3, 2015).
Final Office Action for U.S. Appl. No. 13/830,735 dated Dec. 21, 2015, 20 pages.
Notice of Allowance for U.S. Appl. No. 13/827,987 dated Jan. 4, 2016, 16 pages.
Notice of Allowance for U.S. Appl. No. 13/177,748 dated Jan. 6, 2016, 9 pages.
Non-Final Office Action for U.S. Appl. No. 13/830,428 dated Jan. 15, 2016, 25 pages.
Final Office Action for U.S. Appl. No. 14/037,153 dated Jan. 21, 2016, 31 pages.
Non-Final Office Action for U.S. Appl. No. 13/829,958 dated Feb. 1, 2016, 20 pages.
Ghazal et al., Dynamic plan generation for parameterized queries, Jul. 2009, 7 pages.
Chaudhuri et al., Variance aware optimization of parameterized queries, Jun. 2010, 12 pages.
Seshadri et al., SmartCQL: Semantics to Handle Complex Queries over Data Streams, 2010, 5 pages.
International Search Report and Written Opinion dated Dec. 15, 2015 for PCT/US2015/051268, 17 Pages.
"11 Oracle Event Processing NoSQL 1-20 Database Data Cartridge—IIg Release 1 (11.1.1.7) 11," Oracle Fusion Middleware CQL Language Reference for Oracle Event Processing 11 g Release 1 (11.1.1.7), 4 pages (Sep. 25, 2013).
Oracle Event Processing Hadoop Data Cartridge—11g Release 1(11.1.1.7), Oracle Fusion Middleware CQL LanguageReference for Oracle Event Processing 11g Release 1 (11.1.1.7) 4 pages (Sep. 25, 2013).
Liu "Hbase Con 2014: HBase Design Patterns @Yahoo!" (May 5, 2014), 20 pages.
Hasan et al. "Towards unified and native enrichment in event processing systems," Proceedings of the 7th ACM international conference on Distributed event-based systems, pp. 171-182 (Jun. 29, 2013).
Katsov "In-Stream Big Data Processing : Highly Scalable Blog" 20 pages (Aug. 20, 2013).
Katsov "In-Stream Big Data Processing : Highly Scalable Blog" 19 pages (Aug. 29, 2014).

(56) References Cited

OTHER PUBLICATIONS

Non-Final Office Action for U.S. Appl. No. 14/079,538 dated Oct. 22, 2015, 34 pages.
Non-Final Office Action for U.S. Appl. No. 13/906,162 dated Oct. 28, 2015, 11 pages.
Notice of Allowance for U.S. Appl. No. 14/302,031 dated Nov. 3, 2015, 18 pages.
Final Office Action for U.S. Appl. No. 12/949,081 dated Nov. 17, 2015, 19 pages.
China Patent Office office actions for patent application CN201180053021.4 (Oct. 28, 2015).
Notice of Allowance for U.S. Appl. No. 12/913,636 dated Oct. 27, 2015, 22 pages.
Non-Final Office Action for U.S. Appl. No. 13/830,502 dated Dec. 11, 2015, 25 pages.
Non-Final Office Action for U.S. Appl. No. 11/601,415 dated Nov. 13, 2015, 18 pages.
"Bottom-up parsing", Wikipedia, downloaded from: http://en.wikipedia.org/wiki/Bottom-up_parsing on Sep. 8, 2014, pp. 1-2.
"Branch Predication", Wikipedia, downloaded from: http://en.wikipedia.org/wiki/Branch_predication on Sep. 8, 2014, pp. 1-4.
"Caching Data with SqiDataSource Control"—Jul. 4, 2011, 3 pages.
"Call User Defined Functions from Pig," Amazon Elastic MapReduce Developer Guide (Mar. 2009) 2 pages.
"Pattern Recognition With MATCH_RECOGNIZE," Oracle™ Complex Event Processing CQL Language Reference, 11g Release 1 (11.1.1) E12048-01, May 2009, pp. 15-1 to 15-20.
"SCD—Slowing Changing Dimensions in a Data Warehouse"—Aug. 7, 2011, one page.
"SQL Subqueries"—Dec. 3, 2011, 2 pages.
"Strings in C," Swarthmore College, retreived from internet: http://web.cs.swarthmore.edu/~newhall/unixhelp/C_strings.html (Jun. 12, 207) 3 pages.
"Supply Chain Event Management: Real-Time Supply Chain Event Management," product information Manhattan Associates (copyright 2009-2012) one page.
Purvee, Edwin Ralph, "Optimizing SPARQLeR Using Short Circuit Evaluation of Filter Clauses", Master of Science Thesis, Univ. of Georgia, Athens, GA, © 2009, 66 pages.
Josifovsky, Vanja, et al., "Querying XML Streams", The VLDB Journal, vol. 14, © 2005, pp. 197-210.
Weidong, Yang, et al., "LeoXSS: An Efficient XML Stream System for Processing Complex XPaths", Cit 2006, Seoul, Korea,© 2006, 6 pages.
"Data stream management system", Wikipedia, downloaded from en.wikipedia.org/wiki/Data_stream_management_system on Sep. 23, 2015, pp. 1-5.
Abadi et al., Aurora: a new model and architecture for data stream management, the VLDB Journal the International Journal on very large data bases, vol. 12, No. 2, Aug. 1, 2003, pp. 120-139.
Abadi et al., Yes Aurora: A Data Stream Management System, International Conference on Management of Data, Proceedings of the 2003 ACM SIGMOD International Conference on Management of Data, 2003, 4 pages.
Advisory Action for U.S. Appl. No. 12/548,187 dated Sep. 26, 2014, 6 pages.
Agrawal et al. "Efficient pattern matching over event streams," Proceedings of the 2008 ACM SIGMOD international conference on Management of data, pp. 147-160 (Jun. 2008).
Aho et al., Efficient String Matching: An Aid to Bibliographic Search, Communications of the ACM, vol. 18, No. 6, Association for Computing Machinery, Inc., Jun. 1975, pp. 333-340.
Arasu et al., An Abstract Semantics and Concrete Language for Continuous Queries over Streams and Relations, 9th International Workshop on Database programming languages, Sep. 2003, 12 pages.
Arasu et al., CQL: A language for Continuous Queries over Streams and Relations, Lecture Notes in Computer Science vol. 2921, 2004, pp. 1-19.
Arasu et al., STREAM: The Stanford Data Stream Management System, Department of Computer Science, Stanford University, 2004, p. 21.
Arasu et al., The CQL Continuous Query Language: Semantic Foundations and Query Execution, Stanford University, The VLDB Journal—The International Journal on Very Large Data Bases, vol. 15, No. 2, Springer-Verlag New York, Inc, Jun. 2006, pp. 1-32.
Avnur et al. , Eddies: Continuously Adaptive Query Processing, 2007, 4 pages.
Avnur et al., Eddies: Continuously Adaptive Query Processing, in Proceedings of the 2000 ACM SIGMOD International Conference on Data, Dallas TX, May 2000, 12 pages.
Babcock et al., Models and Issues in Data Streams, Proceedings of the 21st ACM SIGMOD-SIGACT-SIDART symposium on Principles database systems, 2002, 30 pages.
Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.
Babu et al., Continuous Queries over Data Streams, SIGMOD Record, vol. 30, No. 3, Sep. 2001, pp. 109-120.
Bai et al., A Data Stream Language and System Designed for Power and Extensibility, Conference on Information and Knowledge Management, Proceedings of the 15th ACM D International Conference on Information and Knowledge Management, Arlington, Virginia, Copyright 2006, ACM Press., Nov. 5-11, 2006, 10 pages.
Balkesen et al. "Scalable Data Partitioning Techniques for Parallel Sliding Window Processing over Data Streams," 8th International Workshop on Data Management for Sensor Networks (Aug. 2011).
Bose et al., A Query Algebra for Fragmented XML Stream Data, 9th International Conference on Data Base Programming Languages (DBPL), Sep. 2003, 11 pages.
Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.
Buza , Extension of CQL over Dynamic Databases, Journal of Universal Computer Science, vol. 12, No. 9, Sep. 28, 2006, pp. 1165-1176.
Cadonna et al., Efficient event pattern matching with match windows, Proceedings of the 18_ACM SIGKDD international conference on knowledge discovery and data mining (Aug. 2012), pp. 471-479.
Carpenter, User Defined Functions, Retrieved from: URL: http://www.sqlteam.comitemprint.asp?ItemID=979, Oct. 12, 2000, 4 pages.
Chan et al., Efficient Filtering of XML documents with Xpath expressions, 2002, pp. 354-379.
Chandramouli et al. "High-Performance Dynamic Pattern Matching over Disordered Streams," Proceedings of the VLDB Endowment, vol. 3 Issue 1-2, pp. 220-231 (Sep. 2010).
Chandrasekaran et al., PSoup: a system for streaming queries over streaming data, The VLDB Journal, The International Journal on very large data bases, vol. 12, No. 2, Aug. 1, 2003, pp. 140-156.
Chandrasekaran et al., TelegraphCQ: Continuous Dataflow Processing for an UncertainWorld, Proceedings of CIDR, 2003, 12 pages.
Chapple "Combining Query Results with the UNION Command," ask.com Computing Databases, downloaded from: http://databases.about.com/od/sql/a/union.htm (no date, printed on Oct. 14, 2013).
Chen et al., NiagaraCQ: A Scalable Continuous Query System for Internet Databases, Proceedings of the 2000 SIGMOD International Conference on Management of Data, May 2000, pp. 379-390.
Chui, WebSphere Application Server V6.1—Class loader problem determination, IBM.com, 2007.
Colyer et al. , Spring Dynamic Modules Reference Guide, Copyright, ver. 1.0.3, 2006-2008, 73 pages.
Colyer et al. , Spring Dynamic Modules Reference Guide, Ver. 1.1.3, 2006-2008, 96 pages.
Complex Event Processing in the Real World, an Oracle White Paper, Sep. 2007, 13 pages.
"Oracle Complex Event Processing Exalogic Performance Study" an Oracle White Paper, Sep. 2011, 16 pages.
Conway, An Introduction to Data Stream Query Processing, Truviso, Inc., May 24, 2007, 71 pages.

(56) References Cited

OTHER PUBLICATIONS

Coral8 Complex Event Processing Technology Overview, Coral8, Inc., Make it Continuous, Copyright 2007 Coral8, Inc., 2007, pp. 1-8.
Cranor et al., Gigascope: a stream database for network applications, Proceedings of the 2003 Acm Sigmod International Conference on Management of Data SIGMOD '03, Jun. 9, 2003, pp. 647-651.
Creating WebLogic Domains Using the Configuration Wizard, BEA Products, Version 10.0, Dec. 2007, 78 pages.
Creating Weblogic Event Server Applications, BEA WebLogic Event Server, Version. 2.0, Jul. 2007, 90 pages.
De Castro Alves, A General Extension System for Event Processing Languages, DEBS '11, New York, NY, USA, Jul. 11-15, 2011, pp. 1-9.
Demers et al., Towards Expressive Publish/Subscribe Systems, Proceedings of the 10th International Conference on Extending Database Technology (EDBT 2006), Munich, Germany, Mar. 2006, pp. 1-18.
Demichiel et al., JSR 220: Enterprise JavaBeans™, EJB 3.0 Simplified API, EJB 3.0 Expert Group, Sun Microsystems, Ver. 3.0, May 2, 2006, 59 pages.
Dependency Injection, Dec. 30, 2008, pp. 1-7.
Deploying Applications to WebLogic Server, Mar. 30, 2007, 164 pages.
Deshpande et al., Adaptive Query Processing, Slide show believed to be prior to Oct. 17, 2007, 27 pages.
Developing Applications with Weblogic Server, Mar. 30, 2007, 254 pages.
Dewson Beginning SQL Server 2008 for Developers: From Novice to Professional, a Press, Berkeley, CA, © 2008, pp. 337-349 and 418-438.
Diad et al., Query Processing for High-vol. XML Message Brokering, Proceedings of the 29th VLDB Conference, Berlin, Germany, 2003, 12 pages.
Diao, Query Processing for Large-Scale XML Message Brokering, University of California Berkeley, 2005, 226 pages.
Dindar et al., Event Processing Support for Cross-Reality Environments, Pervasive Computing, IEEE CS, Jul.-Sep. 2009, Copyright 2009, IEEE, Jul.-Sep. 2009, pp. 2-9.
EPL Reference, Jul. 2007, 82 pages.
Esper Reference Documentation Version 3.1.0, EsperTech, retrieved from internet at URL: http://esper.codehaus.org/esper-3.1.0/doc/reference/en/pdf/esper_reference.pdf, 2009, 293 pages.
Esper Reference Documentation, Copyright 2007, Ver. 1.12.0, 2007, 158 pages.
Esper Reference Documentation, Copyright 2008, ver. 2.0.0, 2008, 202 pages.
European Application No. 12783063.6, Extended European Search Report mailed on Mar. 24, 2015, 6 pages.
Fantozzi "A Strategic Approach to Supply Chain Event Management," student submission for Masters Degree, Massachusetts Institute of Technology (Jun. 2003) 36 pages.
Fast Track Deployment and Administrator Guide for BEA WebLogic Server, BEA WebLogic Server 10.0 Documentation, printed on May 10, 2010, at URL:http://download.oracle.com/docs/cd/E13222_01/wls/docs100/quickstart/quick_start. html, May 10, 2010, 1 page.
Fernandez et al., Build your own XQuery processor, slide show, at URL: http://www.galaxquery.org/slides/edbt-summer-school2004.pdf, 2004, 116 pages.
Fernandez et al., Implementing XQuery 1.0: The Galax Experience, Proceedings of the 29th VLDB Conference, Berlin, Germany, 2003, 4 pages.
Final Office Action for U.S. Appl. No. 12/396,464 dated May 16, 2014, 15 pages.
Final Office Action for U.S. Appl. No. 12/548,187 dated Jun. 4, 2014, 63 pages.
Final Office Action for U.S. Appl. No. 12/548,281 dated Aug. 13, 2014, 19 pages.
Final Office Action for U.S. Appl. No. 13/089,556 dated Jun. 13, 2014, 13 pages.
Florescu et al., The BEA/XQRL Streaming XQuery Processor, Proceedings of the 29th VLDB Conference, 2003, 12 pages.
Getting Started with WebLogic Event Server, Bea WebLogic Event Server version 2.0, Jul. 2007, 66 pages.
Gilani, Design and implementation of stream operators, query instantiator and stream buffer manager, Dec. 2003, 137 pages.
Golab et al., Issues in Data Stream Management, ACM SIGMOD Record, vol. 32, issue 2, ACM Press, Jun. 2003, pp. 5-14.
Golab et al., Sliding Window Query Processing Over Data Streams, Aug. 2006, 182 pages.
Gosling et al. , The Java Language Specification, 1996-2005, 684 pages.
Hao et al., Achieving high performance web applications by service and database replications at edge servers, Performance Computing and communications conference(IPCCC) IEEE 28th International, IEEE, Piscataway, NJ, USA, 2009, pp. 153-160.
Harish et al., "Identifying Robust Plans through Plan Diagram Reduction", PVLDB '08, Auckland, New Zealand, Aug. 23-28, 2008,pp. 1124-1140.
High Availability Guide, Oracle Application Server, 10g Release 3 (10.1.3.2.0), B32201-01, Jan. 2007, 314 pages.
Hopcroft , Introduction to Automata Theory, Languages, and Computation, Second Edition, Addison-Wesley, Copyright 2001, 524 pages.
Hulten et al., Mining Time-Changing Data Stream, Proceedings of the Seventh ACM SIGKDD International Conference on Knowledge Discovery and Data Mining., Aug. 2001, 10 pages.
Installing Weblogic Real Time, BEA WebLogic Real Time, Ver. 2.0, Jul. 2007, 64 pages.
International Application No. PCT/US2011/052019, International Preliminary Report on Patentability mailed on Mar. 28, 2013, 6 pages.
International Application No. PCT/US2011/052019, International Search Report and Written Opinion mailed on Nov. 17, 2011, 55 pages.
International Application No. PCT/US2012/034970, International Preliminary Report on Patentability mailed on Nov. 21, 2013, 7 pages.
International Application No. PCT/US2012/034970, International Search Report and Written Opinion mailed on Jul. 16, 2012, 13 pages.
International Application No. PCT/US2012/036353, International Preliminary Report on Patentability mailed on Nov. 28, 2013, 6 pages.
International Application No. PCT/US2012/036353, International Search Report and Written Opinion mailed on Sep. 12, 2012, 11 pages.
International Application No. PCT/US2013/062047, International Preliminary Report on Patentability mailed on Apr. 9, 2015, 10 pages.
International Application No. PCT/US2013/062052, International Preliminary Report on Patentability mailed on Apr. 9, 2015, 18 pages.
International Application No. PCT/US2014/010832, Written Opinion mailed on Dec. 15, 2014, 5 pages.
International Application No. PCT/US2014/017061, International Preliminary Report on Patentability mailed on May 28, 2015, 7 pages.
International Application No. PCT/US2014/017061, Written Opinion mailed on Feb. 3, 2015, 6 pages.
International Application No. PCT/US2014/039771, International Search Report and Written Opinion mailed on Sep. 24, 2014, 12 pages.
International Application No. PCT/US2014/039771, Written Opinion mailed on Apr. 29, 2015, 6 pages.
International Application No. PCT/US2014/068641, International Search Report and Written Opinion mailed on Feb. 26, 2015, 11 pages.
International Application No. PCT/US2015/016346, International Search Report and Written Opinion mailed on May 4, 2015, 10 pages.

(56) References Cited

OTHER PUBLICATIONS

International Preliminary Report on Patentability dated Jun. 18, 2015 for PCT/US2013/073086, 7 pages.
International Search Report and Written Opinion dated Dec. 15, 2014 for PCT/US2014/010920, 10 pages.
International Search Report and Written Opinion dated Jul. 16, 2014 for PCT/US2013/062047.
International Search Report and Written Opinion dated Jul. 2, 2014 for PCT/US2013/062050.
International Search Report and Written Opinion dated Jul. 3, 2014 for PCT/US2013/062052.
International Search Report and Written Opinion dated Mar. 14, 2014 for PCT/US2013/073086.
International Search Report and Written Opinion dated Sep. 12, 2014 for PCT/US2014/017061.
Introduction to BEA WebLogic Server and BEA WebLogic Express, BEA WebLogic Server, Ver. 10.0, Mar. 2007, 34 pages.
Introduction to WebLogic Real Time, Jul. 2007, 20 pages
Jboss Enterprise Application Platform 4.3 Getting Started Guide CP03, for Use with Jboss Enterprise Application Platform 4.3 Cumulative Patch 3, Jboss a division of Red Hat, Red Hat Documentation Group, Copyright 2008, Red Hat, Inc., Sep. 2007, 68 pages.
Jin et al., ARGUS: Efficient Scalable Continuous Query Optimization for Large-Volume Data Streams, 10th International Database Engineering and Applications Symposium (IDEAS'06), 2006, 7 pages.
Kawaguchi et al., Java Architecture for XML Binding (JAXB) 2.2, Sun Microsystems, Inc., Dec. 10, 1999, 384 pages.
Knuth et al., Fast Pattern Matching in Strings, Siam J Comput. vol. 6(2), Jun. 1977, pp. 323-350.
Komazec et al. "Towards Efficient Schema-Enhanced Pattern Matching over RDF Data Streams," Proceedings of the 1st International Workshop on Ordering and Reasoning (OrdRing 2011), Bonn, Germany, (Oct. 2011).
Kräamer, Continuous Queries Over Data Streams—Semantics and Implementation, Fachbereich Mathematik and Informatik der Philipps-Universitat, Marburg, Germany, Retrieved from the Internet: URL:http://archiv.ub.uni-marburg.de/dissjz007/0671/pdfjdjk. pdf, Jan. 1, 2007; 313 pages.
Lakshmanan et al., On efficient matching of streaming XML documents and queries, 2002, 18 pages.
Lindholm et al., Java Virtual Machine Specification, 2nd Edition Prentice Hall, Apr. 1999, 484 pages.
Liu et al., Efficient XSLT Processing in Relational Database System, Proceeding of the 32nd. International Conference on Very Large Data Bases (VLDB), Sep. 2006, pp. 1106-1116.
Luckham, What's the Difference Between ESP and CEP? , Complex Event Processing, downloaded, at URL:http://complexevents.com/ ?p=103, Apr. 29, 2011, 5 pages.
Madden et al., Continuously Adaptive Continuous Queries (CACQ) over Streams, SIGMOD 2002, Jun. 4-6, 2002, 12 pages.
Managing Server Startup and Shutdown, BEA WebLogic Server, ver. 10.0, Mar. 30, 2007, 134 pages.
Martin et al., Finding Application Errors and Security Flaws Using PQL, a Program Query Language, OOPSLA'05, Oct. 16, 2005, pp. 1-19.
Matching Behavior, .NET Framework Developer's Guide, Microsoft Corporation, Retrieved on: Jul. 1, 2008, URL: http://msdn.microsoft.com/en-us/library/Oyzc2ybO(printer).aspx, 2008, pp. 1-2.
Microsoft Computer Dictionary, 5th Edition, Microsoft Press, Redmond, WA, © 2002, pp. 238-239 and 529.
Motwani et al., Query Processing Resource Management, and Approximation in a Data Stream Management System, Jan. 2003, 12 pages.
Munagala et al., Optimization of Continuous Queries with Shared Expensive Filters, Proceedings of the 26th ACM SIGMOD-SIGACT-SIGART symposium on Principles of database systems, Oct. 17, 2007, 14 pages.
Nah et al., A Cluster-Based TMO-Structured Scalable Approach for Location Information Systems, Object-Oriented Real-Time Dependable Systems, 2003. WORDS 2003 Fall. Proceedings. Ninth IEEE International Workshop on Date of Conference: Oct. 1-3, 2003, pp. 225-233.
New Project Proposal for Row Pattern Recognition—Amendment to SQL with Application to Streaming Data Queries, H2-2008-027, H2 Teleconference Meeting, Jan. 9, 2008, pp. 1-6.
Nichols et al., A faster closure algorithm for pattern matching in partial-order event data, IEEE International Conference on Parallel and Distributed Systems (Dec. 2007), pp. 1-9.
Non-Final Office Action for U.S. Appl. No. 11/601,415 dated Dec. 11, 2013, 57 pages.
Non-Final Office Action for U.S. Appl. No. 12/396,464 dated Dec. 31, 2013, 15 pages.
Non-Final Office Action for U.S. Appl. No. 12/548,187 dated Feb. 6, 2014, 53 pages.
Non-Final Office Action for U.S. Appl. No. 12/548,281 dated Feb. 13, 2014, 19 pages.
Non-Final Office Action for U.S. Appl. No. 12/913,636 dated Jul. 24, 2014, 21 pages.
Non-Final Office Action for U.S. Appl. No. 12/949,081 dated Jan. 28, 2015, 20 pages.
Non-Final Office Action for U.S. Appl. No. 12/957,201 dated Jul. 30, 2014, 12 pages.
Non-Final Office Action for U.S. Appl. No. 13/089,556 dated Jan. 9, 2014, 13 pages.
Non-Final Office Action for U.S. Appl. No. 13/107,742 dated Jun. 19, 2014, 20 pages.
Non-Final Office Action for U.S. Appl. No. 13/107,742 dated Jan. 21, 2015, 23 pages.
Non-Final Office Action for U.S. Appl. No. 13/177,748 dated Feb. 3, 2015, 22 pages.
Non-Final Office Action for U.S. Appl. No. 13/764,560 dated Sep. 12, 2014, 23 pages.
Non-Final Office Action for U.S. Appl. No. 13/770,961 dated Jan. 4, 2015, 22 pages.
Non-Final Office Action for U.S. Appl. No. 13/770,969 dated Aug. 7, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 13/829,958 dated Dec. 11, 2014, 15 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/838,259 dated Oct. 24, 2014, 21 pages.
Non-Final Office Action for U.S. Appl. No. 13/839,288 dated Dec. 4, 2014, 30 pages.
Non-Final Office Action for U.S. Appl. No. 13/906,162 dated Dec. 29, 2014, 10 pages.
Non-Final Office Action for U.S. Appl. No. 14/077,230 dated Dec. 4, 2014, 30 pages.
Non-Final Office Action for U.S. Appl. No. 14/302,031 dated Aug. 27, 2014, 19 pages.
Non-Final Office Action for U.S. Appl. No. 11/601,415 dated Oct. 6, 2014, 18 pages.
Notice of Allowance for U.S. Appl. No. 12/396,464 dated Sep. 3, 2014, 7 pages.
Notice of Allowance for U.S. Appl. No. 12/957,201 dated Jan. 21, 2015, 5 pages.
Notice of Allowance for U.S. Appl. No. 13/089,556 dated Oct. 6, 2014, 9 pages.
Notice of Allowance for U.S. Appl. No. 13/770,969 dated Jan. 22, 2015, 5 pages.
Novick, Creating a User Defined Aggregate with SQL Server 2005, URL: http://novicksoftware.com/Articles/sql-2005-product-user-defined-aggregate.html, 2005, 6 pages.

(56) References Cited

OTHER PUBLICATIONS

Ogrodnek "Custom UDFs and hive," Bizo development blog http://dev.bizo.com (Jun. 23, 3009) 2 pages.
Oracle Application Server 10g, Release 2 and 3, New Features Overview, an Oracle White Paper, Oracle., Oct. 2005, 48 pages.
Oracle Application Server, Administrator's Guide, 10g Release 3 (10.1.3.2.0), B32196-01, Oracle, Jan. 2007, 376 pages.
Oracle Application Server, Enterprise Deployment Guide, 10g Release 3 (10.1.3.2.0), B32125-02, Oracle, Apr. 2007, 120 pages.
Oracle CEP Getting Started, Release 11 gR1 (11.1.1) E14476-01, May 2009, 172 pages.
Oracle Complex Event Processing CQL Language Reference, 11g Release 1 (11.1.1) E12048-03, Apr. 2010, 540 pages.
Oracle Database Data Cartridge Developer's Guide, B28425-03, 11 g Release 1 (11.1), Oracle, Mar. 2008, 372 pages.
Oracle Database, SQL Language Reference 11 g Release 1 (11.1), B28286-02, Oracle, Sep. 2007, 1496 pages.
Oracle Database, SQL Reference, 10g Release 1 (10.1), Part No. B10759-01, Dec. 2003, 7-1 to 7-17; 7-287 to 7-290; 14-61 to 14-74.
Oracle® Complex Event Processing EPL Language Reference 11g Release 1 (11.1.1.4.0), E14304-02, Jan. 2011, 80 pages.
Oracle™ Complex Event Processing CQL Language Reference, 11g Release 1 (11.1.1.4.0) E12048-04,(Jan. 2011), pp. title page, iii-xxxviii, 1-1 to 4-26, 6-1 to 6-12, 18-1 to 20-26, Index-1 to Index-14.
Oracle™ Fusion Middleware CQL Language Reference, 11g Release 1 (11.1.1.6.3) E12048-10, (Aug. 2012) pp. title page, iii-xxxvi, 1-1 to 4-26, 6-1 to 6-12, 18-1 to 20-26, Index-1 to Index-14.
OSGI Service Platform Core Specification, The OSGI Alliance, OSGI Alliance, Apr. 2007, 288 pages.
PCT Patent Application No. PCT/US2014/010832, International Search Report mailed on Apr. 3, 2014, 9 pages.
Peng et al., Xpath Queries on Streaming Data, 2003, pp. 1-12.
Peterson, Petri Net Theory and the Modeling of Systems, Prentice Hall, 1981, 301 pages.
Postgressql, Documentation: Manuals: PostgresSQL 8.2: User-Defined Aggregates believed to be prior to Apr. 21, 2007, 4 pages.
Pradhan "Implementing and Configuring SAP® Event Management" Galileo Press, pp. 17-21 (copyright 2010).
Rao et al., "Compiled Query Execution Engine using JVM", ICDE '06, Atlanta, GA, Apr. 3-7, 2006, 12 pages.
Ray et al., Optimizing complex sequence pattern extraction using caching, data engineering workshops (ICDEW) 2011 IEEE 27th international conference on IEEE, Apr. 11, 2011, pp. 243-248.
Release Notes, BEA WebLogic Event Server, Ver. 2.0, Jul. 2007, 8 pages.
Sadri et al., Expressing and Optimizing Sequence Queries in Database Systems, ACM Transactions on Database Systems, vol. 29, No. 2, ACM Press, Copyright 2004, Jun. 2004, pp. 282-318.
Sadtler et al., WebSphere Application Server Installation Problem Determination, Copyright 2007, IBM Corp., 2007, pp. 1-48.
Sansoterra, Empower SQL with Java User-Defined Functions, ITJungle.com., Oct. 9, 2003, 9 pages.
Shah et al., Flux: an adaptive partitioning operator for continuous query systems, Proceedings of the 19th International Conference on Data Engineering, Mar. 5-8, 2003, pp. 25-36.
Sharaf et al., Efficient Scheduling of Heterogeneous Continuous Queries, VLDB '06, Sep. 12-15, 2006, pp. 511-522.
Spring Dynamic Modules for OSGi Service Platforms product documentation, Jan. 2008, 71 pages.
SQL Tutorial-In, Tizag.com, http://web.archive.org/web/20090216215219/http://www.tizag.com/sqiTutorial/sqlin.php,, Feb. 16, 2009, pp. 1-3.
Stillger et al., "LEO-DB2's LEarning Optimizer", Proc. of the VLDB, Roma, Italy, Sep. 2001, pp. 19-28.
Stolze et al., User-defined Aggregate Functions in DB2 Universal Database, Retrieved from: <http://www.128. ibm.com/deve10perworks/d b2/library/tachartic1e/0309stolze/0309stolze. html>, Sep. 11, 2003, 11 pages.
Stream Base New and Noteworthy, Stream Base, Jan. 12, 2010, 878 pages.
Stream Query Repository: Online Auctions, at URL: http://www-db.stanford.edu/stream/sqr/onauc.html#queryspecsend, Dec. 2, 2002, 2 pages.
Stream: The Stanford Stream Data Manager, Retrieved from: URL: http://infolab.stanford.edu/stream/, Jan. 5, 2006, pp. 1-9.
Stump et al., Proceedings, The 2006 Federated Logic Conference, IJCAR '06 Workshop, PLPV '06: Programming Languages meets Program Verification., 2006, pp. 1-113.
Takenaka et al., A scalable complex event processing framework for combination of SQL-based continuous queries and C/C++ functions, FPL 2012, Oslo, Norway, Aug. 29-31, 2012, pp. 237-242.
Terry et al., Continuous queries over append-only database, Proceedings of ACM SIGMOD, 1992, pp. 321-330.
The Stanford Stream Data Manager, IEEE Data Engineering Bulletin, Mar. 2003, pp. 1-8.
Tho et al. "Zero-latency data warehousing for heterogeneous data sources and continuous data streams," 5th International Conference on Information Integrationand Web-based Applications Services (Sep. 2003) 12 pages.
Tomàs et al., RoSeS: A Continuous Content-Based Query Engine for RSS Feeds, DEXA 2011, Toulouse, France, Sep. 2, 2011, pp. 203-218.
U.S. Appl. No. 10/948,523, Final Office Action mailed on Jul. 6, 2007, 37 pages.
U.S. Appl. No. 10/948,523, Non-Final Office Action mailed on Dec. 11, 2007, 48 pages.
U.S. Appl. No. 10/948,523, Notice of Allowance mailed on Dec. 1, 2008, 17 pages.
U.S. Appl. No. 10/948,523, Notice of Allowance mailed on Jul. 8, 2008, 28 pages.
U.S. Appl. No. 10/948,523, Office Action mailed on Jan. 22, 2007, 32 pages.
U.S. Appl. No. 10/948,523, Supplemental Notice of Allowance mailed on Jul. 17, 2008, 4 pages.
U.S. Appl. No. 10/948,523, Supplemental Notice of Allowance mailed on Aug. 25, 2008, 3 pages.
U.S. Appl. No. 11/601,415, Final Office Action mailed on May 27, 2009, 26 pages.
U.S. Appl. No. 11/601,415, Final Office Action mailed on Jul. 2, 2012, 58 pages.
U.S. Appl. No. 11/601,415, Final Office Action mailed on Jun. 30, 2010, 45 pages.
U.S. Appl. No. 11/601,415, Non-Final Office Action mailed on Sep. 17, 2008, 10 pages.
U.S. Appl. No. 11/601,415, Non-Final Office Action mailed on Nov. 30, 2009, 32 pages.
U.S. Appl. No. 11/601,415, Office Action mailed on Dec. 9, 2011, 44 pages.
U.S. Appl. No. 11/873,407, Final Office Action mailed on Apr. 26, 2010, 11 pages.
U.S. Appl. No. 11/873,407, Non-Final Office Action mailed on Nov. 13, 2009, 7 pages.
U.S. Appl. No. 11/873,407, Notice of Allowance mailed on Nov. 10, 2010, 14 pages.
U.S. Appl. No. 11/873,407, Notice of Allowance mailed on Mar. 7, 2011, 8 pages.
U.S. Appl. No. 11/874,197, Final Office Action mailed on Aug. 12, 2011, 21 pages.
U.S. Appl. No. 11/874,197, Final Office Action mailed on Jun. 29, 2010, 17 pages.
U.S. Appl. No. 11/874,197, Non-Final Office Action mailed on Dec. 22, 2010, 22 pages.
U.S. Appl. No. 11/874,197, Notice of Allowance mailed on Jun. 22, 2012, 20 pages.
U.S. Appl. No. 11/874,197, Office Action mailed on Nov. 10, 2009, 14 pages.
U.S. Appl. No. 11/874,202, Final Office Action mailed on Jun. 8, 2010, 18 pages.
U.S. Appl. No. 11/874,202, Non-Final Office Action mailed on Dec. 3, 2009, 15 pages.

(56) References Cited

OTHER PUBLICATIONS

U.S. Appl. No. 11/874,202, Notice of Allowance mailed on Mar. 31, 2011, 9 pages.
U.S. Appl. No. 11/874,202, Notice of Allowance mailed on Dec. 22, 2010, 13 pages.
U.S. Appl. No. 11/874,850, Notice of Allowance mailed on Jan. 27, 2010, 11 pages.
U.S. Appl. No. 11/874,850, Notice of Allowance mailed on Nov. 24, 2009, 12 pages.
U.S. Appl. No. 11/874,850, Notice of Allowance mailed on Dec. 11, 2009, 5 pages.
U.S. Appl. No. 11/874,896, Final Office Action mailed on Jul. 23, 2010, 28 pages.
U.S. Appl. No. 11/874,896, Non-Final Office Action mailed on Dec. 8, 2009, 15 pages.
U.S. Appl. No. 11/874,896, Non-Final Office Action mailed on Nov. 22, 2010, 25 pages.
U.S. Appl. No. 11/874,896, Notice of Allowance mailed on Jun. 23, 2011, 5 pages.
U.S. Appl. No. 11/927,681, Non-Final Office Action mailed on Mar. 24, 2011, 14 pages.
U.S. Appl. No. 11/927,681, Notice of Allowance mailed on Jul. 1, 2011, 8 pages.
U.S. Appl. No. 11/927,683, Final Office Action mailed on Sep. 1, 2011, 18 pages.
U.S. Appl. No. 11/927,683, Non-Final Office Action mailed on Mar. 24, 2011, 10 pages.
U.S. Appl. No. 11/927,683, Notice of Allowance mailed on Nov. 9, 2011, 7 pages.
U.S. Appl. No. 11/977,437, Final Office Action mailed on Apr. 8, 2010, 18 pages.
U.S. Appl. No. 11/977,437, Non-Final Office Action mailed on Oct. 13, 2009, 9 pages.
U.S. Appl. No. 11/977,437, Notice of Allowance mailed on Jul. 10, 2013, 10 pages.
U.S. Appl. No. 11/977,437, Notice of Allowance mailed on Mar. 4, 2013, 9 pages.
U.S. Appl. No. 11/977,437, Office Action mailed on Aug. 3, 2012, 16 pages.
U.S. Appl. No. 11/977,439, Non-Final Office Action mailed on Apr. 13, 2010, 7 pages.
U.S. Appl. No. 11/977,439, Notice of Allowance mailed on Mar. 16, 2011, 10 pages.
U.S. Appl. No. 11/977,439, Notice of Allowance mailed on Aug. 18, 2010, 11 pages.
U.S. Appl. No. 11/977,439, Notice of Allowance mailed on Sep. 28, 2010, 6 pages.
U.S. Appl. No. 11/977,439, Notice of Allowance mailed on Nov. 24, 2010, 8 pages.
U.S. Appl. No. 11/977,440, Notice of Allowance mailed on Oct. 7, 2009, 6 pages.
U.S. Appl. No. 12/395,871, Non-Final Office Action mailed on May 27, 2011, 7 pages.
U.S. Appl. No. 12/395,871, Notice of Allowance mailed on May 4, 2012, 5 pages.
U.S. Appl. No. 12/395,871, Office Action mailed on Oct. 19, 2011, 8 pages.
U.S. Appl. No. 12/396,008, Non-Final Office Action mailed on Jun. 8, 2011, 9 pages.
U.S. Appl. No. 12/396,008, Notice of Allowance mailed on Nov. 16, 2011, 5 pages.
U.S. Appl. No. 12/396,464, Final Office Action mailed on Jan. 16, 2013, 16 pages.
U.S. Appl. No. 12/396,464, Non-Final Office Action mailed on Sep. 7, 2012, 17 pages.
U.S. Appl. No. 12/506,891, Notice of Allowance mailed on Jul. 25, 2012, 8 pages.
U.S. Appl. No. 12/506,891, Office Action mailed on Dec. 14, 2011, 17 pages.
U.S. Appl. No. 12/506,905, Notice of Allowance mailed on Dec. 14, 2012, 8 pages.
U.S. Appl. No. 12/506,905, Office Action mailed on Aug. 9, 2012, 33 pages.
U.S. Appl. No. 12/506,905, Office Action mailed on Mar. 26, 2012, 60 pages.
U.S. Appl. No. 12/534,384, Notice of Allowance mailed on May 7, 2013, 11 pages.
U.S. Appl. No. 12/534,384, Office Action mailed on Feb. 28, 2012, 12 pages.
U.S. Appl. No. 12/534,384, Office Action mailed on Feb. 12, 2013, 13 pages.
U.S. Appl. No. 12/534,398, Final Office Action mailed on Jun. 5, 2012, 16 pages.
U.S. Appl. No. 12/534,398, Notice of Allowance mailed on Nov. 27, 2012, 9 pages.
U.S. Appl. No. 12/534,398, Office Action mailed on Nov. 1, 2011, 14 pages.
U.S. Appl. No. 12/548,187, Final Office Action mailed on Jun. 10, 2013, 17 pages.
U.S. Appl. No. 12/548,187, Non Final Office Action mailed on Sep. 27, 2011, 17 pages.
U.S. Appl. No. 12/548,187, Non-Final Office Action mailed on Apr. 9, 2013, 17 pages.
U.S. Appl. No. 12/548,187, Office Action mailed on Jun. 20, 2012, 31 pages.
U.S. Appl. No. 12/548,209, Notice of Allowance mailed on Oct. 24, 2012, 12 pages.
U.S. Appl. No. 12/548,209, Office Action mailed on Apr. 16, 2012, 16 pages.
U.S. Appl. No. 12/548,222, Non-Final Office Action mailed on Apr. 10, 2013, 16 pages.
U.S. Appl. No. 12/548,222, Non-Final Office Action mailed on Oct. 19, 2011, 17 pages.
U.S. Appl. No. 12/548,222, Notice of Allowance mailed on Jul. 18, 2013, 12 pages.
U.S. Appl. No. 12/548,222, Office Action mailed on Jun. 20, 2012, 20 pages.
U.S. Appl. No. 12/548,281, Final Office Action mailed on Oct. 10, 2013, 21 pages.
U.S. Appl. No. 12/548,281, Non-Final Office Action mailed on Apr. 12, 2013, 16 pages.
U.S. Appl. No. 12/548,281, Non-Final Office Action mailed on Oct. 3, 2011, 18 pages.
U.S. Appl. No. 12/548,281, Office Action mailed on Jun. 20, 2012, 29 pages.
U.S. Appl. No. 12/548,290, Final Office Action mailed on Jul. 30, 2012, 21 pages.
U.S. Appl. No. 12/548,290, Non-Final Office Action mailed on Oct. 3, 2011, 15 pages.
U.S. Appl. No. 12/548,290, Non-Final Office Action mailed on Apr. 15, 2013, 17 pages.
U.S. Appl. No. 12/548,290, Notice of Allowance mailed on Sep. 11, 2013, 6 pages.
U.S. Appl. No. 12/913,636, Final Office Action mailed on Jan. 8, 2013, 21 pages.
U.S. Appl. No. 12/913,636, Non-Final Office Action mailed on Apr. 1, 2015, 22 pages.
U.S. Appl. No. 12/913,636, Office Action mailed on Jun. 7, 2012.
U.S. Appl. No. 12/949,081, Final Office Action mailed on Aug. 27, 2013, 12 pages.
U.S. Appl. No. 12/949,081, Non-Final Office Action mailed on Jan. 9, 2013, 12 pages.
U.S. Appl. No. 12/957,194, Non-Final Office Action mailed on Dec. 7, 2012, 11 pages.
U.S. Appl. No. 12/957,194, Notice of Allowance mailed on Mar. 20, 2013, 9 pages.
U.S. Appl. No. 12/957,201, Final Office Action mailed on Apr. 25, 2013, 10 pages.
U.S. Appl. No. 12/957,201, Office Action mailed on Dec. 19, 2012, 13 pages.
U.S. Appl. No. 13/089,556, Final Office Action mailed on Aug. 29, 2013, 10 pages.

(56) References Cited

OTHER PUBLICATIONS

U.S. Appl. No. 13/089,556, Non-Final Office Action mailed on Apr. 10, 2013, 9 pages.
U.S. Appl. No. 13/089,556, Office Action mailed on Nov. 6, 2012, 12 pages.
U.S. Appl. No. 13/102,665, Final Office Action mailed on Jul. 9, 2013, 16 pages.
U.S. Appl. No. 13/102,665, Office Action mailed on Feb. 1, 2013, 13 pages.
U.S. Appl. No. 13/107,742, Final Office Action mailed on Jul. 3, 2013, 19 pages.
U.S. Appl. No. 13/107,742, Non-Final Office Action mailed on Feb. 14, 2013, 16 pages.
U.S. Appl. No. 13/177,748, Non-Final Office Action mailed on Aug. 30, 2013, 23 pages.
U.S. Appl. No. 13/184,528, Notice of Allowance mailed on Mar. 1, 2012, 16 pages.
U.S. Appl. No. 13/193,377, Notice of Allowance mailed on Aug. 30, 2013, 18 pages.
U.S. Appl. No. 13/193,377, Office Action mailed on Aug. 23, 2012, 20 pages.
U.S. Appl. No. 13/193,377, Office Action mailed on Jan. 17, 2013, 24 pages.
U.S. Appl. No. 13/244,272, Final Office Action mailed on Mar. 28, 2013, 29 pages.
U.S. Appl. No. 13/244,272, Notice of Allowance mailed on Aug. 12, 2013, 12 pages.
U.S. Appl. No. 13/244,272, Office Action mailed on Oct. 4, 2012, 29 pages.
U.S. Appl. No. 13/764,560, Final Office Action mailed on Apr. 15, 2015, 19 pages.
U.S. Appl. No. 13/827,631, Final Office Action mailed on Apr. 3, 2015, 11 pages.
U.S. Appl. No. 13/827,987, Final Office Action mailed on Jun. 19, 2015, 10 pages.
U.S. Appl. No. 13/829,958, Final Office Action mailed on Jun. 19, 2015, 17 pages.
U.S. Appl. No. 13/830,129, Non-Final Office Action mailed on Feb. 27, 2015, 19 pages.
U.S. Appl. No. 13/830,428, Final Office Action mailed on Jun. 4, 2015, 21 pages.
U.S. Appl. No. 13/830,735, Non-Final Office Action mailed on May 26, 2015, 19 pages.
U.S. Appl. No. 13/838,259, Non-Final Office Action mailed on Jun. 9, 2015, 37 pages.
U.S. Appl. No. 13/839,288, Notice of Allowance mailed on Apr. 3, 2015, 12 pages.
U.S. Appl. No. 13/906,162, Final Office Action mailed on Jun. 10, 2015, 10 pages.
U.S. Appl. No. 14/037,153, Non-Final Office Action mailed on Jun. 19, 2015, 23 pages.
U.S. Appl. No. 14/037,171, Non-Final Office Action mailed on Jun. 3, 2015, 15 pages.
U.S. Appl. No. 14/077,230, Notice of Allowance mailed on Apr. 16, 2015, 16 pages.
U.S. Appl. No. 14/302,031, Final Office Action mailed on Apr. 22, 2015, 23 pages.
U.S. Appl. No. 14/692,674, Non-Final Office Action mailed on Jun. 5, 2015, 10 pages.
U.S. Appl. No. 13/177,748, Final Office Action mailed on Mar. 20, 2014, 23 pages.
Ullman et al., Introduction to JDBC, Stanford University, 2005, 7 pages.
Understanding Domain Configuration, BEA WebLogic Server, Ver. 10.0, Mar. 30, 2007, 38 pages.
Notice of Allowance for U.S. Appl. No. 12/548,187 dated Aug. 17, 2015, 18 pages.
Notice of Allowance for U.S. Appl. No. 13/107,742 dated Jul. 8, 2015, 9 pages.
Non-Final Office Actio for U.S. Appl. No. 14/037,072 dated Jul. 9, 2015, 12 pages.
Final Office Action for U.S. Appl. No. 13/830,502 dated Jun. 30, 2015, 25 pages.
Non-Final Office Action for U.S. Appl. No. 14/036,659 dated Aug. 13, 2015, 33 pages.
Non-Final Office Action for U.S. Appl. No. 13/830,759 dated Aug. 7, 2015, 23 pages.
International Preliminary Report on Patentability dated Jul. 29, 2015 for PCT/US2014/010920, 30 pages.
International Preliminary Report on Patentability dated Jul. 29, 2015 for PCT/US2014/039771, 24 pages.
U.S. Appl. No. 13/102,665, Notice of Allowance mailed on Nov. 24, 2014, 9 pages.
Japan Patent Office office actions JPO patent application JP2013-529376 (Aug. 18, 2015).
Final Office Action for U.S. Appl. No. 13/177,748 dated Aug. 21, 2015, 24 pages.
Non-Final Office Action for U.S. Appl. No. 14/036,500 dated Aug. 14, 2015, 26 pages.
Notice of Allowance for U.S. Appl. No. 13/830,129 dated Sep. 22, 2015, 9 pages.
Final Office Action for U.S. Appl. No. 13/770,961 dated Aug. 31, 2015, 28 pages.
Non-Final Office Action for U.S. Appl. No. 13/764,560 dated Oct. 6, 2015, 18 pages.
Non-Final Office Action for U.S. Appl. No. 14/621,098 dated Oct. 15, 2015, 21 pages.
Notice of Allowance for U.S. Appl. No. 14/692,674 dated Oct. 15, 2015, 10 pages.
Notice of Allowance for U.S. Appl. No. 14/037,171 dated Oct. 15, 2015, 14 pages.
Vajjhala et al., The Java Architecture for XML Binding (JAXB) 2.0, Apr. 19, 2006, 384 pages.
Vijayalakshmi et al., Processing location dependent continuous queries in distributed mobile databases using mobile agents, IET-UK International Conference on Information and Communication Technology in Electrical Sciences (ICTES 2007), Dec. 22, 2007, pp. 1023-1030.
W3C, XML Path Language (Xpath), W3C Recommendation, Version. 1.0, Retrieved from: URL: http://www.w3.org/TR/xpath, Nov. 16, 1999, 37 pages.
Wang et al., Distributed continuous range query processing on moving objects, DEXA'06 Proceedings of the 17th international conference on Database and Expert Systems Applications, 2006, pp. 655-665.
WebLogic Event Server Administration and Configuration Guide, BEA WebLogic Event D Server, Version. 2.0, Jul. 2007, 108 pages.
WebLogic Event Server Reference, BEA WebLogic Event Server, Version. 2.0, Jul. 2007, 52 pages.
Weblogic Server Performance and Tuning, BEA WebLogic Server, Ver. 10.0, Mar. 30, 2007, 180 pages.
WebSphere Application Server V6.1 Problem Determination: IBM Redpaper Collection, Dec. 2007, 634 pages.
What is BPM? Datasheet [online]. IBM, [retrieved on Jan. 28, 2013]. Retrieved from the Internet: <URL: http://www-01.ibm.com/software/info/bpm/whatis-bpm/>.
White et al., WebLogic Event Server: A Lightweight, Modular Application Server for Event Processing, 2nd International Conference on Distributed Event-Based Systems, Rome, Italy, Copyright 2004., Jul. 2-4, 2008, 8 pages.
Widom et al., CQL: A Language for Continuous Queries over Streams and Relations, Oct. 17, 2007, 62 pages.
Widom et al., The Stanford Data Stream Management System, PowerPoint Presentation, Oct. 17, 2007, 110 pages.
Wilson "SAP Event Management, an Overview," Q Data USA, Inc.( copyright 2009) 16 pages.
Wu et al., Dynamic Data Management for Location Based Services in Mobile Environments, Database Engineering and Applications Symposium, 2003, Jul. 16, 2003, pp. 172-181.
Zemke, XML Query, Mar. 14, 2004, 29 pages.
U.S. Appl. No. 13/829,958, Non-Final Office Action mailed on Dec. 27, 2016, 20 pages.

(56) References Cited

OTHER PUBLICATIONS

U.S. Appl. No. 13/838,259, Non-Final Office Action mailed on Jan. 4, 2017, 65 pages.
U.S. Appl. No. 14/559,550, Non-Final Office Action mailed on Jan. 27, 2017, 16 pages.
U.S. Appl. No. 14/610,971, Non-Final Office Action mailed on Dec. 19, 2016, 10 pages.
U.S. Appl. No. 14/621,098, Non Final Office Action mailed on Nov. 14, 2016, 17 pages.
U.S. Appl. No. 15/015,933, Non-Final Office Action mailed on Jan. 30, 2017, 11 pages.
U.S. Appl. No. 13/830,759, Non-Final Office Action mailed on Feb. 10, 2017, 23 pages.
U.S. Appl. No. 13/827,631, Non-Final Office Action mailed on Feb. 16, 2017, 16 pages.
International Application No. PCT/US2015/051268, International Preliminary Report on Patentability mailed on Dec. 8, 2016, 12 pages.
Sadana "Interactive Scatterplot for Tablets," The 12th International Working Conference on Advanced Visual Interfaces, available from https://vimeo.com/97798460 (May 2014).
U.S. Appl. No. 13/830,428, Non-Final Office Action mailed on Mar. 22, 2017, 25 pages.
U.S. Appl. No. 13/830,502, Non-Final Office Action mailed on Apr. 7, 2017, 28 pages.
U.S. Appl. No. 14/036,500, Non-Final Office Action mailed on Feb. 9, 2017, 34 pages.
U.S. Appl. No. 14/079,538, Non-Final Office Action mailed on Mar. 31, 2017, 24 pages.
U.S. Appl. No. 15/360,650, Non-Final Office Action mailed on Mar. 9, 2017, 34 pages.
U.S. Appl. No. 13/830,735, Non-Final Office Action mailed on Apr. 4, 2017, 16 pages.
U.S. Appl. No. 15/177,147, Non-Final Office Action mailed on Apr. 7, 2017, 12 pages.
U.S. Appl. No. 14/866,512, Non-Final Office Action mailed on Apr. 10, 2017, 24 pages.
U.S. Appl. No. 14/610,971, Notice of Allowance mailed on Apr. 12, 2017, 11 pages.
China Patent Application No. CN201480030482.3, Office Action mailed on Feb. 4, 2017, 5 pages.

* cited by examiner

HYBRID EXECUTION OF CONTINUOUS AND SCHEDULED QUERIES

CROSS REFERENCES TO RELATED APPLICATIONS

This application is a continuation of, and claims benefit and priority to application Ser. No. 13/828,640, filed Mar. 14, 2013, entitled "HYBRID EXECUTION OF CONTINUOUS AND SCHEDULED QUERIES," (now allowed) which claims benefit and priority under 35 U.S.C. §119(e) to U.S. Provisional Patent Application No. 61/707,641, filed Sep. 28, 2012, entitled REAL-TIME BUSINESS EVENT ANALYSIS AND MONITORING, the entire contents of which are incorporated herein by reference for all purposes. This application is also related to application Ser. No. 13/827,987, filed Mar. 14, 2013, entitled "TACTICAL QUERY TO CONTINUOUS QUERY CONVERSION," (now allowed) the entire contents of which is hereby incorporated by reference as if fully set forth herein, under 35 U.S.C. §120.

BACKGROUND

Many companies use business intelligence (BI) systems for strategic and tactical decision making where the decision-making cycle may span a time period of several weeks or months. Competitive pressures, however, are forcing companies to react faster to changing business conditions and customer requirements. As a result, there is now a desire to use BI to help drive and optimize business operations on a daily basis in some cases. Additionally, data associated with a database or streaming data may be stored, managed, and/or processed in many different ways. As noted, some BI data may focus on business events. Other BI data may include historical key performance indicator (KPI) information. In some uses cases, utilizing scheduled and/or tactical queries to retrieve and/or process such business event data may be beneficial. Additionally, in other examples, utilizing continuous queries to retrieve such business event data may make more sense. However, managing the different types of queries as well as memory usage associated with the queries may pose technical challenges to query engines and/or the service providers that implement them.

BRIEF SUMMARY

Techniques for managing the hybrid execution of continuous and scheduled queries are provided. In some examples, a computing system may initialize a query engine with relational data from at least a first source. The first source may include a relational database. The computing system may also enable the query engine to provide query results based at least in part on the relational data from the first source and the streaming data from the second source. In some examples, the second source may be an event processor configured to provide real-time data. The streaming data from the second source may include the real-time data provided by the event processor. Additionally, in some examples, enabling the query engine to provide the query results based at least in part on the relational data and the streaming data may include at least joining the relational data and the streaming data. Alternatively, or in addition, enabling the query engine to provide the query results based at least in part on the relational data and the streaming data may include at least providing a second query that includes the relational data to a continuous query language engine. Further, enabling the query engine to provide the query results based at least in part on the relational data and the streaming data may also include at least receiving the query results from the continuous query language engine based at least in part on the provided second query that includes the relational data.

Additionally, in some examples, a computer-readable memory may be provided. The memory may store a plurality of instructions that cause one or more processors to at least generate a stream associated with a first source. The stream may be generated based at least in part on a data definition language. The stream may also be configured to operate with an event processing engine to the first source, and the first source may be associated with a complex event processor. Additionally, in some examples, the instructions may cause the one or more processors to at least receive a first query result from a second source. Further, the instructions may cause the one or more processors to at least include the first query result from the second source in the generated stream. The instructions may cause the one or more processors to at least provide a second query result based at least in part on the generated stream and the first query result. Additionally, in some examples, the first query result may be received based at least in part on a schedule. Further, including the first query result from the second source in the generated stream may include at least generating the stream to include an identifier associated with the first query result.

Furthermore, in some examples, a method may be provided. The method may be configured to generate a stream associated with an event processor. In some aspects, the method may also be configured to register the generated stream with a query engine. In some examples, the query engine may be configured based at least in part on a continuous query language. The method may also be configured to provide, to a data source, a first query based at least in part on a schedule. In some aspects, the data source may include at least a relational database. The relational database may also include at least historical performance indicators. The method may also be configured to receive, from the data source, a first query result based at least in part on the first query. In some examples, the method may also be configured to include the first query result from the data source in the registered stream. Additionally, in some examples, the method may be configured to provide a second query result based at least in part on the registered stream and the first query result. The first query may be provided to a scheduler of the relational database. Additionally, the scheduler may be configured to perform the first query on the relational database based at least in part on the schedule. Further, in some examples, including the first query result from the data source in the registered stream may include at least generating the stream to include an identifier associated with the first query result.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

Figure 1:
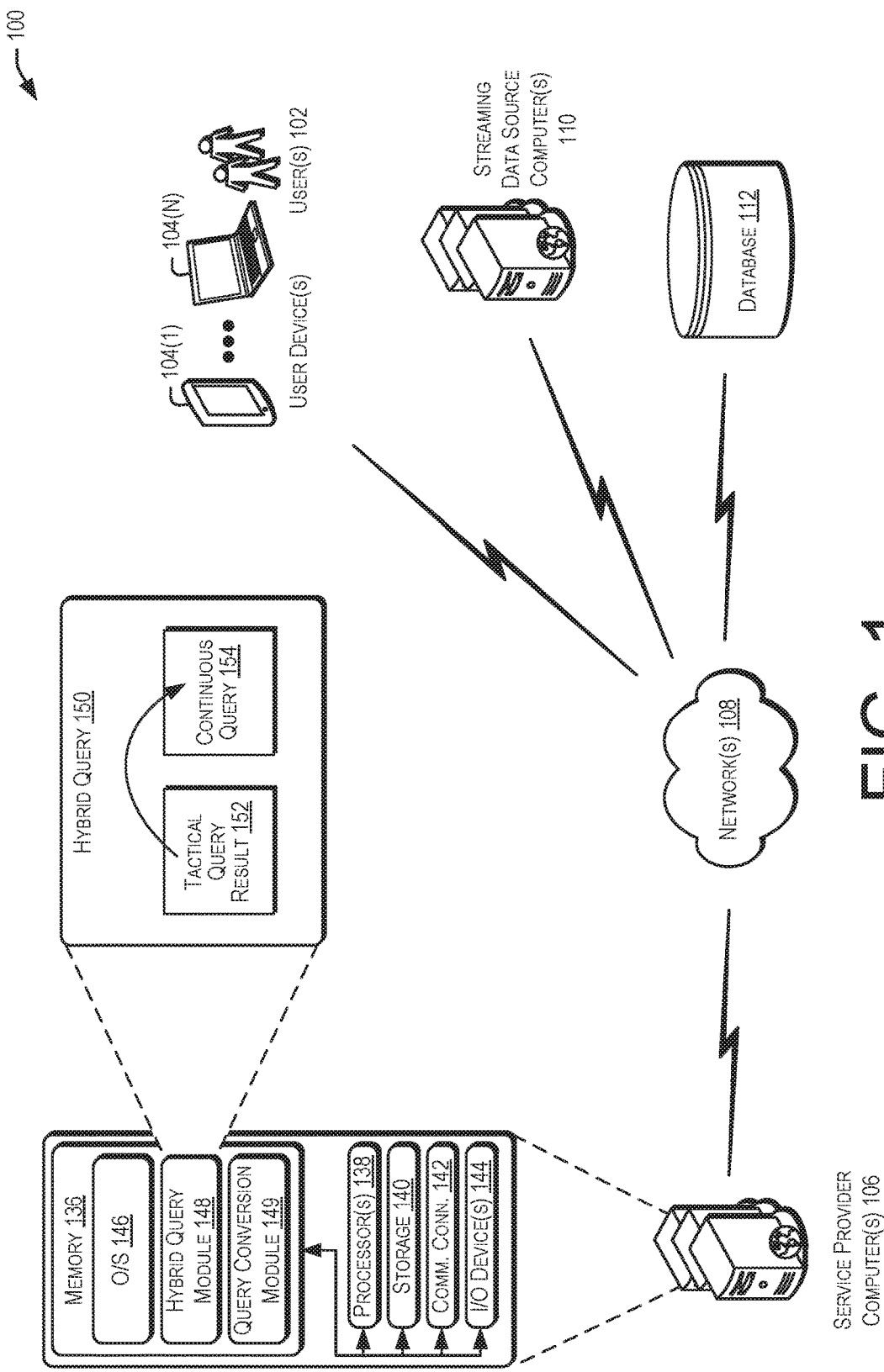
FIG. 1 is a simplified block diagram illustrating an example architecture for managing the hybrid execution of continuous and scheduled queries, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some examples, mechanisms to support the combination of continuous query language (CQL) queries with other queries including, but not limited to, tactical queries (e.g., on a timer), strategic queries, relational queries, etc., may be implemented. The present disclosure may also provide the ability to embed structured query language (SQL) queries (e.g., with a timer) into CQL queries in such a way that the SQL queries can be executed on a timer and the result set used within the CQL statement. Additionally, in some examples, mechanisms to support the conversion of tactical queries to continuous queries may be implemented. For example, a query engine may be configured with one or more tactical queries configured to enable pulling data from a database or other data source. In some aspects, the tactical query may be converted to a continuous query at runtime. In this way, the query engine may then be configured to receive data pushed via a stream or other real-time data source.

A continuous data stream (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

. . .
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
. . .

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

In the business event monitoring and analytics platforms, there may be a desire to use historical key performance indicators (KPIs) as thresholds within a continuous query. One example of using such historical KPIs as threshold may include requesting and/or providing a KPI trend in a trend line (e.g., by the hour) along with an average, median, and/or standard deviation (e.g., allowing comparison against a historical timeframe, such as the median value from previous day or the like). In such a case, the historical KPIs may be queried against the database, and the historical KPI may be joined with the results from the function. Alternatively, or in addition, the historical KPI may be shipping to the database with a table in the CQL engine (also referred to herein, as a "CQL engine"). Additionally, in some examples, the historical KPI may be utilized to populate the historical table as a relation in the CQL engine.

Additionally, in some examples, an abstraction of the historical KPI as a stream may be pushed automatically to the CQL engine based at least in part on a schedule from or associated with a business requirement and may provide easy to use language syntax and better resource utilization in terms of computation and memory.

In some aspects, a similar case may be supported by joining streams/relations with an external table and/or shipping the function to a database. The function shipping to the database, however, may be requested to occur for every (or a subset of every) input data of the stream. However, in other examples, a custom adapter may be added to poll the table and push it as the stream. However, this approach may include additional java coding outside of the CQL engine.

Yet, by abstracting the business case of historical KPI within a single query, it may be possible to capture the business case and it may be possible to utilize the business case easily. By having an internal stream that joins to the relation, there is minimum invocation of database queries. Additionally, by encapsulating the stream generation within the single query, a custom adaptor may be avoided.

In some examples, business intelligence (BI) may help drive and optimize business operations at particular intervals (e.g., on a daily basis in some cases). This type of BI is usually called operational business intelligence, real-time business intelligence, or operational intelligence (OI). Operational Intelligence, in some examples, blurs the line between BI and business activity monitoring (BAM). For example, BI may be focused on periodic queries of historic data. As such, it may have a backward-looking focus. However, BI may also be placed into operational applications, and it may therefor expand from a mere strategic analytical tool into the front lines in business operations. As such, BI systems may also be configured to analyze event streams and compute aggregates in real time.

In some examples, a continuous query language service (CQ Service) may be configured to extend a BI analytics server to handle continuous queries and enable real-time alerts. The CQ Service, in some aspects, may provide integration with a BI analytics server and a CQL engine. By way of example only, a BI analytics server may delegate continuous queries to the CQ Service and the CQ Service may also act as a logical database (DB) gateway for a CQL engine. In this way, the CQL engine may be able to leverage the BI analytics server for its analytics capabilities and semantic modeling.

In some examples, the CQ Service may provide, among other things, the following functionalities:
  Remoting service for BI Analytics Server as CQL engine Gateway;
  Event source/sink adapter;
  Generate data definition languages (DDLs) from logical SQL plus CQL extensions;
  Provide unified model for all types of continuous queries and implementation selections;
  Maintain metadata and support restartability; and
  High availability and scalability support.

Additionally, in some examples, OI is a form of real-time dynamic, business analytics that can deliver visibility and insight into business operations. OI is often linked to or compared with BI or real-time BI, in the sense that both help make sense out of large amounts of information. But there are some basic differences: OI may be primarily activity-centric, whereas BI may be primarily data-centric. Additionally, OI may be more appropriate for detecting and responding to a developing situation (e.g., trend and pattern), unlike BI which may traditionally be used as an after-the-fact and report-based approach to identifying patterns.

In some examples, a business event analysis and monitoring (BEAM) system may include a CQL engine to process and/or receive in-flight data. For example, a CQL engine may be an in-memory database engine configured to query or otherwise process incoming real-time information (e.g., BI or OI). The CQL engine may utilize or understand temporal semantics and be configured to allow definition of a window of data to process. Utilizing a CQL engine may, in some cases, involve always running a query on incoming data.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

Additionally, in some examples, the present disclosure may describe dashboard customization and/or personalization. A CEP engine may be configured to include advanced, continuous analysis of real-time information and historical data. Business process models (BPMs) may include performing model-driven execution of policies and processes defined as BPM notation (BPMN) models. Key result indicators (KRI) may be utilized to tell a user how they have done in a perspective or critical success factor (CSF). For example, it may provide results for many actions, it may cover a longer period of time than key performance indicators (KPIs), and/or it may be reviewed on monthly or quarterly periods. Result indicators (RIs) may be utilized to tell a user what they have done. For example, it may summarize activity, and financial performance measure and/or it may update daily, weekly, or monthly. Further, in some aspects, performance indicators (PIs) may be utilized to inform a user what actions to take or at least make recommendations. Additionally, it may include non-financial information and may, in some cases, complement the KPI.

In some aspects, PI may be reviewed 24/7, daily, weekly, or less regularly. In some cases, KPI may include a set of measures that are most critical for the current and future success of an organization. Some KPIs may be updated daily or even 24/7 while the rest of the information may be reported weekly. Examples of KPI notifications may include, but are not limited to, whether a plane or other service vehicle was delayed or whether a trailer has been sent out underweight the previous day for a distribution company (e.g., to discover better utilization of the trucks).

In some examples, embodiments for managing real-time business events may include integrating (e.g., seamlessly) business activity monitoring, complex event processing, and business intelligence to provide a complex, and real-time set of operational information. Additionally, continuous monitoring of business events may be utilized to gain real-time visibility of business processes and/or workflows. In some examples, OI may be supplemented with traditional business intelligence. As such, operational intelligence may give more insight into business operations versus BI, which, as noted above, is more data centric. For example, OI may get inside to determine how a business is doing in a real-time fashion. Whereas BI may be more akin to data warehousing (e.g., indicating information after the fact).

Examples of KPI may include real-time call processing time. For example, a user may set real time KPI to be 15 minutes, versus weeks or days. As such, users may be enabled to take actions right away. Further, by coupling historical (data centric) information from BI warehouses with current real-time data, users may be able to view how a business is running in the current state (including continuously updated, streaming data). In some examples, advanced continuous analysis of real-time information may be included in the data processing. Additionally, incremental computations may be performed and included in displays, visualizations, user interfaces (UIs), etc.

Additionally, in some examples, the present disclosure may be directed towards enabling the conversion of tactical queries to continuous queries. As noted above, the conversion may be enabled at runtime such that a user may request the conversion while viewing static data and/or historical business event data retrieved via one or more tactical queries. In some aspects, a business event analysis and monitoring (BEAM) composer may be a web application that provides Design Time at Run Time (DT@RT) capabilities to are capable of defining dashboards, KPIs, and/or alerts. It may be built, in some examples, using a Service Oriented Architecture (SOA) common console framework or other suitable framework. It may act as a design time tool to build alerts and business dashboards and it may be configured to hide the complexity of CQL, data controls, ADF task flows, interactions with the analytics server, etc., from user. It may also help users create the data objects (semantic layer) requested by business views in dashboards. As such, methods may be implemented for converting from tactical query (e.g., SQL or other language for querying historical data) to a real-time query (e.g., CQL or other type of continuous query language). In some examples, the conversion may include changing from a data pull model to a data push model. Further, the conversion may also provide the ability to slice and dice the data and/or enable personalization by a user.

In some examples, one or more dashboards or other user interfaces may be provided that may be configured to allow "slice and dice" functionality of the business views at runtime. Through "slice and dice," functionality, there may be at least three functionalities available to the user including, but not limited to, filters, dimension changes, and/or activation of an active data service (ADS). In some aspects, a user may be able to apply filters on the tactical and/or continuous queries that are already being implemented or have already begun collecting and/or displaying data. For example, a query that is already saved at design time may have a filter applied to it such that the only particular (e.g., relevant as determined by the user) data may be provided. Additionally, in some aspects, a user may also be able to change the dimension (e.g., when the dimension is selected at design time) at runtime (e.g., while viewing the data on the dashboard). Further, in some examples, a user may be able to view real-time changes happening to the data of the original business view's query. For example, the view may be changed from static to active in order to activate a visualization of the changes occurring on the data. In other words, by enabling the ADS, the system may be configured to convert a tactical query into a continuous query to account for real-time data changes. In some examples, each of the above changes may remain implemented for each particular user and may be saved as part of a user personalization (e.g., associated with a user profile or other setting).

The techniques described above and below may be implemented in a number of ways and in a number of contexts. Several example implementations and contexts are provided with reference to the following figures, as described below in more detail. However, the following implementations and contexts are but a few of many.

FIG. 1 depicts a simplified example system or architecture 100 in which techniques for managing the hybrid execution of continuous and scheduled queries may be implemented. In architecture 100, one or more users 102 (e.g., account holders) may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112. The databases 112 may be relational databases, SQL servers, or the like and may, in some examples, manage historical data, event data, relations, archived relations, or the like on behalf of the users 102. Additionally, the databases 112 may receive or otherwise store data provided by the streaming data source computers 110. In some examples, the users 102 may utilize the user devices 104 to interact with the service provider computers 106 by providing queries (also referred to as "query statements") or other requests for data (e.g., historical event data, streaming event data, etc.). Such queries or requests may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the fast path evaluation of Boolean predicates described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the identity interface computers 120 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least a hybrid query module 148 and/or a query conversion module 149. As used herein, modules may refer to programming modules executed by servers or clusters of servers that are part of a service. In this particular context, the modules may be executed by the servers or clusters of servers that are part of the service provider computers 106. In some examples, the hybrid query module 148 may be configured to generate or otherwise provide one or more hybrid queries 150 for combining and/or executing the combination of continuous queries and scheduled database queries. For example, a continuous query (e.g., a stream) may be instantiated, and the results of a database query (e.g., on a timer) may be pushed to or otherwise included in the continuous query. Further, in some examples, a hybrid query 150 may include one or more tactical query results 152 being included in a continuous query 154. In this way, non-continuous queries (e.g., the tactical query that provides the tactical query result 152) may effectively be performed continuously. Additionally, a few examples of the operations of the hybrid query module 148 and/or the service provider computers 106 are described in greater detail below.

Additionally, in some examples, the query conversion module 149 may be configured to enable conversion of tactical queries into continuous queries. As noted above, the conversion may be performed at runtime and may enable the users 102 to view (via an interface of the user devices 104) real-time changes to historical data was previously displayed statically (e.g., in a non-active way). In some aspects, the user 102 may be able to make visualizations active at runtime while viewing the static data (e.g., from a tactical query) in a dashboard or other user interface displayed by the user devices 104 and/or provided by the service provider computers 106. The user 102, in some examples, may need to be first authenticated and authorized for access to the dashboard and/or the query conversion module 149 functionality. By default, some dashboard views may come with SQL as the query behind the business views. If a user 102 wants to turn a static view into active one, he or she may be able to utilize the query conversion module 149 (e.g., through selection of an icon or other interface element of the dashboard). The query conversion module 149 may then convert the tactical (i.e., the SQL query in this example) into a continuous query (e.g., a CQL query) and the view may be reloaded within the dashboard to handle active changes. Other functionality (e.g., filtering and/or dimension changes) may also be enabled via the dashboard. Additionally, in some examples, the user 102 may be able to active the ADS at runtime and see the active data in the concerned view (e.g., the dashboard). These changes may be specific to the user 102 and may not affect views of other users.

In some examples, when the user 102 activates the ADS at runtime, a pageDef file (or other definition file) may be updated to indicate that the active view has been activated. Additionally, a UI or other interface may provide a popup that may allow the activation of ADS using a checkbox, drop down box, etc. Internally, the query conversion module 149 may convert the tactical query to a continuous query based at least in part on the user 102 selection and/or the pageDef file. A sliding window and/or range may also be specified via the UI. As noted above, changes in a pageDef file may only be implemented for specific users 102 making the request (e.g., checking the box, etc.). As noted, activating ADS at runtime may allow users 102 to change a tactical query into a continuous query at runtime. In some examples, when a business view is rendered in a dashboard, the user 102 may be able to choose a "Make Active" option from a setting section of the UI displaying the dashboard.

Once a user 102 requests that the view become active, some options may enabled that the user 102 can use to setup the active data properties. For example, active data collapsing and/or time window functionality may be offered. The active data collapsing functionality may include, but is not limited to, allowing the user 102 to collapse the data into one or more chunks and update the data within each chunk at once (e.g., in a specified time interval). Additionally, the time window functionality may include, but is not limited to, allowing the user 102 to specify whether the user 102 wants a time window in the data or not. If so, this option may also allow the user 102 to specify the window length and an interval after which the window should be updated. Once the user 102 selects the properties, the user 102 may make a selection (e.g., selecting an "ok" icon or the like) which may setup the data and, after a refresh of the graph, the business view may be made active. In some cases, a managed Java bean, which may be associated with each business view, make take care of populating the data in a popup. It may also handle a popup close event, which may in turn invoke code to make the appropriate changes to the pageDef document of the business view. A data control (DC) layer may then pick the data from the pageDef file and make the view active.

Additional types of computer storage media (which may also be non-transitory) that may be present in the service provider computers 106 and/or user devices 104 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 106 and/or user devices 104. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 2:
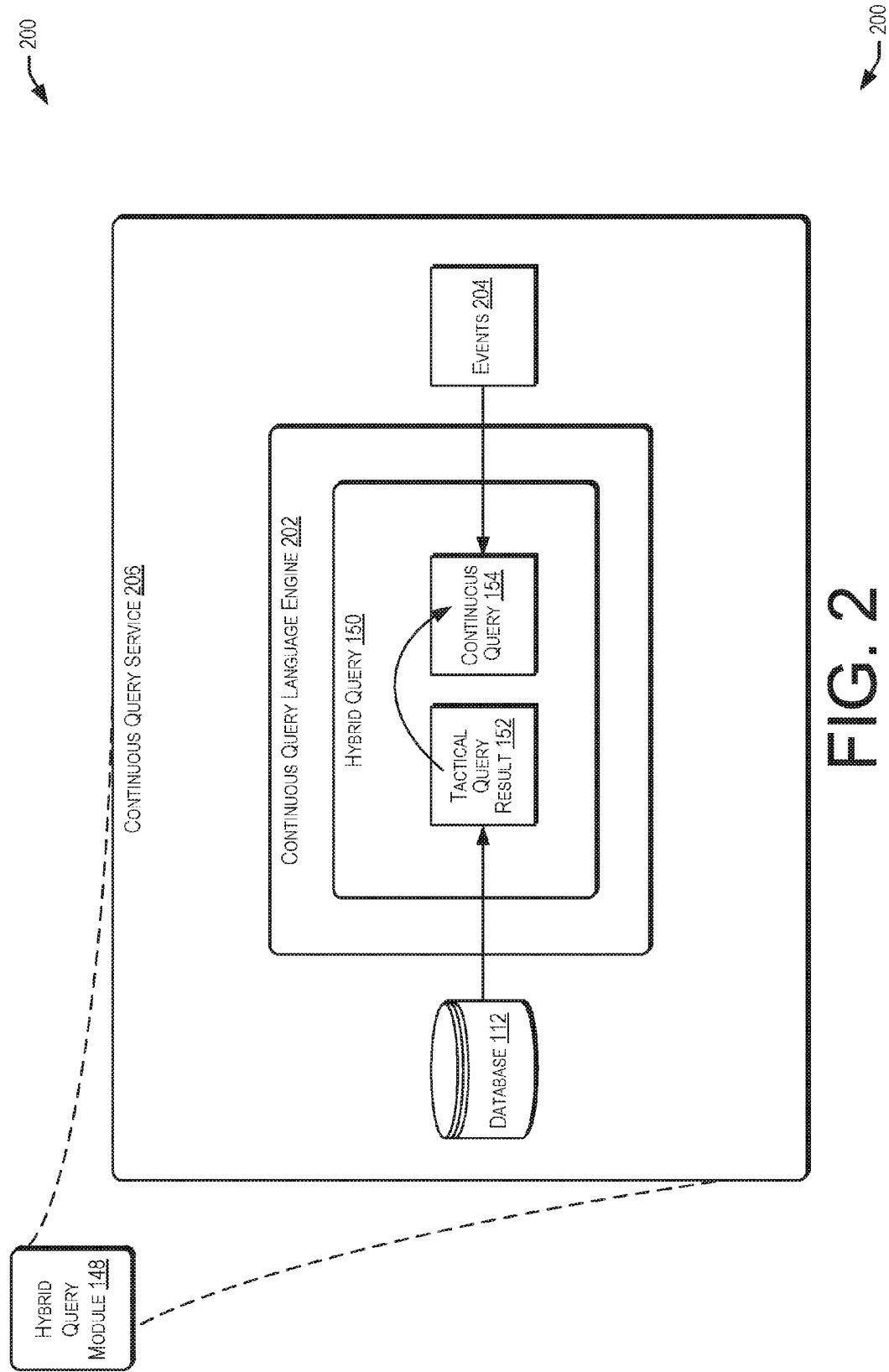
FIG. 2 is a simplified block diagram illustrating at least some features of the management of the hybrid execution of continuous and scheduled queries described herein, according to at least one example.

FIG. 2 illustrates a simplified block diagram 200 with which features of the hybrid execution of continuous queries and scheduled queries may be described. As noted above, in some examples, the hybrid query 150 may be executed by the hybrid query module 148 of FIG. 1 and may include one or more tactical query results 152 and/or one or more continuous queries 154. In some examples, the hybrid query 150 be performed or otherwise managed by a CQL engine 202. The CQL engine 202 may be configured to perform continuous queries (e.g., based at least in part on streaming data, event data, live data, real-time data, etc.). As such, performing the hybrid execution of a tactical query and continuous query may include, but is not limited to, executing the hybrid query 150. In some cases, the hybrid query 150 may be implemented and/or refreshed based at least in part on a schedule or other time interval.

In some aspects, a tactical query may retrieve data from a database similar to or the same as the database 112 of FIG. 1. The tactical query result 152 (i.e., data from the database 112) may then be included in the continuous query 154 (e.g., as an attribute or other value) that is set up to retrieve or otherwise collect events 204 from an event stream. In some examples, the events may be received from the streaming data source computers 110 of FIG. 1 or from other sources and/or streams. However, in some cases, the database 112 and/or the streaming events 204 may be outside or otherwise not accessible by the CQL engine 202. In this way, the CQL engine 202 may depend and/or rely on the hybrid query 150 for the final results. Additionally, in some examples, a continuous query service (also referred to as a "CQ service") 206 may manage and/or control the CQL engine 202 and/or the hybrid query 150.

In some examples, as noted above, the hybrid query 150 may be implemented to allow a database query language to be utilized in conjunction with continuous queries 154. For example, an SQL query (i.e., a tactical query that may provide the tactical query result 152) may be utilized to get a result 152 from the database 112. This result 152 may then be utilized in a continuous query 154 to run on streaming data (i.e., the events 204). In other words, the hybrid query 150 may provide the ability to query a stream of event data 204 based at least in part on a database query. Further, the hybrid query 150 may provide the ability to run a continuous query 154 at a periodic basis.

The hybrid query 150 may also support queries that combine continuous queries with a historical BI logical query (e.g., this may be another example of a tactical query). For example, when historical KPI data is used within a continuous query model, the historical BI logical query may run with a schedule and the result may get passed to the CQL engine 202 as a stream. In some cases, implementation of the hybrid query 150 may involve a syntax that includes both CQL features and historical BI logical query (e.g., on a schedule) features. In some examples, the syntax may include the following examples:

create query <fully qualified query name> as <cql>
  with <fully qualified stream name> as <historical bi logical sql> <schedule>

Additionally, the stream name may match with the stream in a "where" clause of the continuous query. The stream name may also be fully qualified. The query may be given in the quoted string. The query may be opaque to the CQ service 206 and the CQ service 206 may not attempt to parse it. Further, a schedule syntax may be the same as the one used in the scheduled tactical query without an "expire" clause.

In some aspects, the hybrid query 150 may include three parts, the continuous part, the tactical part, and the schedule part. The following hybrid query 150 illustrates one non-limiting example which sends an alert if the average call processing time is bigger than the average call processing time from yesterday where the average call processing time is calculated every midnight.

```
create query CALLCENTER.callcenter4hkpi as
istream(
select avg(callProcessingTime) as measure,
    avg(callProcessingTime) - max(B.prevDayCPT) as
    actualDeviation,
    max(B.allowedDeviation) as allowedDeviation from
CALLCENTER.CallCenterFact_DO[range 480 hour on
callClosedTime] as A,
    CALLCENTER.CC4HistKPI[rows 1] as B
where callStatus = 'CLOSED'
)
with CALLCENTER.CC4HistKPI as
"select avg(callProcessingTime) as prevDayCPT,
    stddev(callProcessingTime) as allowedDeviation
from CALLCENTER.CallCenterFact_DO
where callStatus = 'CLOSED' AND
TIMESTAMPDIFF(SQL_TSI_DAY, callClosedTime,
CURRENT_TIMESTAMP)>0 "
    refresh on "0:0" every 1 day
```

With the above hybrid continuous query 150 example, the following operations may be occurring:

1. A stream, CALLCENTER.CC4HistKPI is created using a ddl, 'create stream CALLCENTER.CC4HistKPI(prevDayCPT double, allowedDeviatin double)'.
2. The cql part is registered to the CQL engine as the regular cql.
3. The SQL part runs with a scheduler in the beam product following the given schedule, '0:0 AM every 1 days'.
4. The result from the SQL run is pushed to the CQL engine by the beam product as the stream.
5. The join part in the cql part handles joining between the stream and relation.

Figure 3:
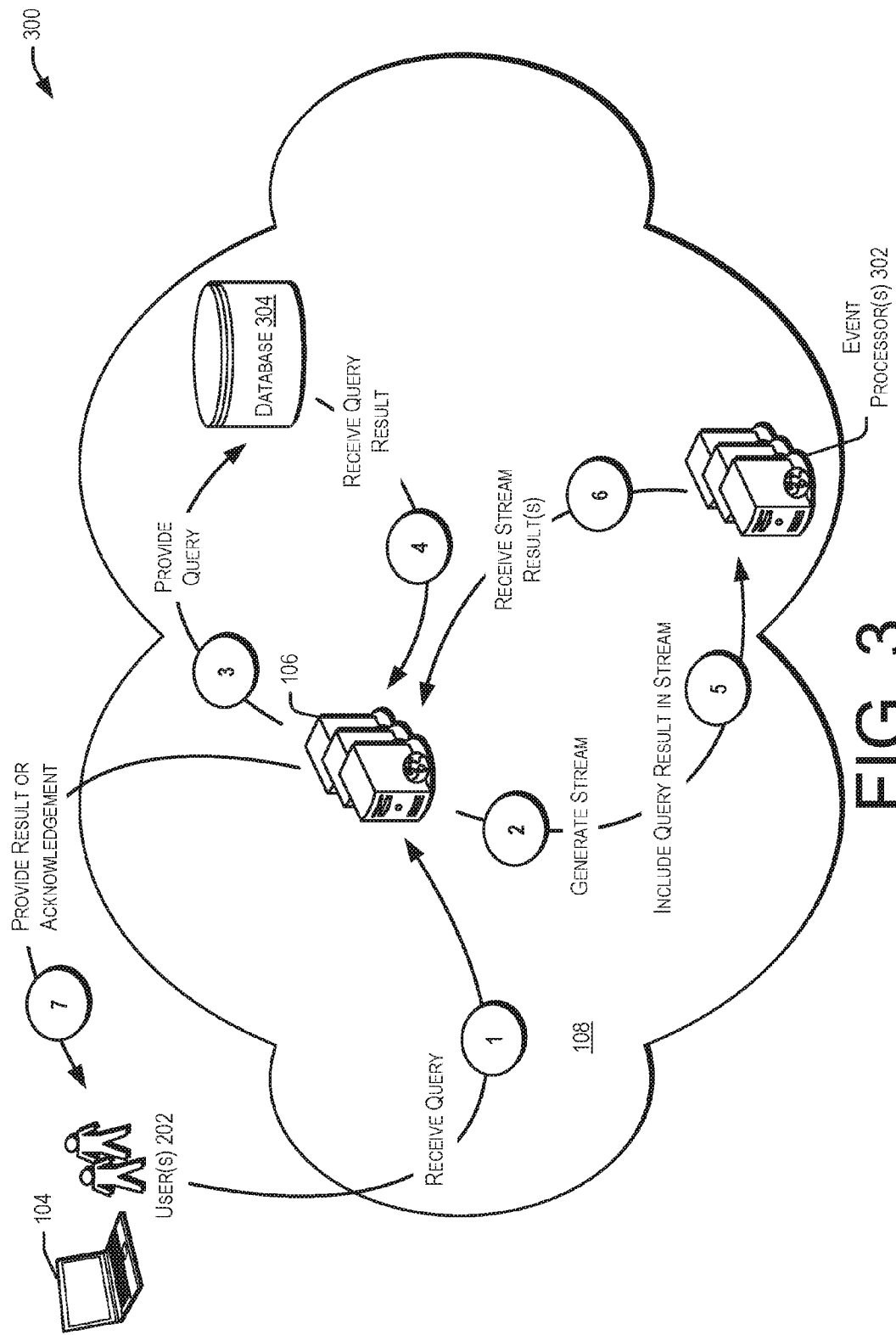
FIG. 3 is a simplified flow diagram illustrating at least some additional features of the management of the hybrid execution of continuous and scheduled queries described herein, according to at least one example.

FIG. 3 depicts a simplified flow diagram showing one or more techniques 300 for implementing the hybrid execution of continuous and scheduled queries, according to one example. In FIG. 3, the service provider computers 106 are again shown in communication with the users 102 and/or user devices 104 via the networks 108. Additionally, in some examples, the service provider computers 106 may include or be in communication (e.g., via the networks 108) with one or more event processor computers 302 and/or databases 304. While techniques 300 are shown in FIG. 3 in a particular order (including arbitrary sequence numbers), it should be understood that no particular order is necessary and that one or more steps or parts of the techniques 300 may be omitted, skipped, and/or reordered. In at least one non-limiting example, the one or more service provider computers 106 described above with reference to FIGS. 1 and 2 may receive queries and/or data processing requests (e.g., KPI and/or BI data) from the user devices 104. The queries and/or data requests may be configured to request processing (e.g., retrieval, storage, deletion, etc.) of database data (e.g., data stored by the databases 304) and/or streaming event data (e.g., data being received in real-time from the event processors 302). Additionally, in some examples, the service provider computers 106 may also generate a stream and/or register the stream with a continuous query engine (e.g., but not limited to, the CQL engine 202 of FIG. 2), a service (e.g., but not limited to, the CQ service 206 of FIG. 2), and/or the event processors 302. The stream may be configured to retrieve or otherwise collect real-time KPI data from the event processors 302.

In some examples, the service provider computers 106 may also provide or implement one or more tactical queries (e.g., an SQL query or the like) to retrieve historical data from the database 304 or another storage system. In some examples, the query may be provided or otherwise implemented based at least in part on a schedule. Based at least in part on the tactical query, the service provider computers 106 may receive data from the database 304. In other words, the service provider computers 106 may receive the query results. The service provider computers 106 may then include the tactical query result in the stream such that the continuous query may be processed based at least in part on that tactical query result. The service provider computers 106 may then receive data from the stream (i.e., the continuous query result) and provide the data and/or acknowledgement of processing to the user computers 104.

Figure 4:
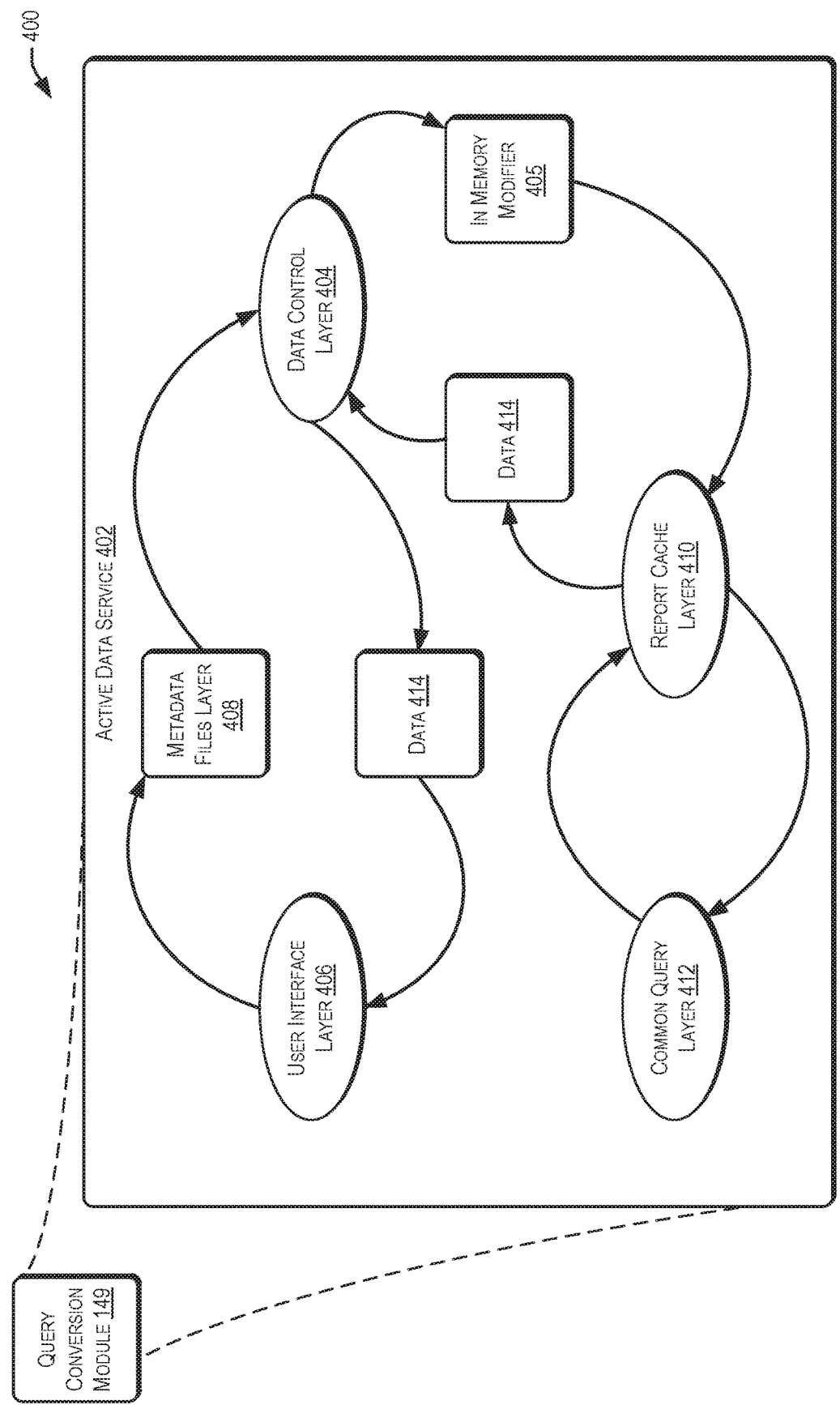
FIG. 4 is a simplified flow diagram illustrating at least some additional features of the tactical query to continuous query conversion described herein, according to at least one example.

FIG. 4 illustrates a simplified block diagram 400 with which features of the tactical query to continuous query conversion may be described. As noted above, in some examples, an active data service (ADS) 402 may be executed by the query conversion module 149 of FIG. 1 and may include one or more programming layers (also referred to as modules). The implementation of these features (i.e., the layers and/or the options noted above), may be managed by the DC layer 404. In some examples, the DC layer 404 maybe a binding component of an application development framework (ADF) and may be authored in a JDev Environment. The DC layer 404 may be created at DT@RT and may be equipped with a mechanism to change queries dynamically and re-construct the binding definition on the fly to support run time slice and dice. Furthermore, it may also be the conduit to convert a tactical query to a continuous query. In some cases, personalization may be applied so each instance of the dashboard can support its own slice and dice.

The DC layer 404 may be configured to pick up the values form the pageDef of the business view. The DC layer 404 may also get access of the pageDef of the business view to which it is bound to through the ADF context. It may then make changes to an in-memory modifier 405 and set it up to the next later to fetch the data and return it to the business view. The ADS 402 may also include a UI layer 406, a Meta Data Service 408, a Report Cache layer 410, and/or a Common Query layer 412. The UI layer 406 may provide options to the user 102 for setting up new filters. The UI layer 406 may also capture the information provided by the user 102 and set it up in the metadata files in an appropriate format that can be understood by the next layer. The Meta Data Service layer 408 may be configured to allow the update of the underlying pageDef of the business views to be updated and the values captured from the UI layer 406. Once these changes are made, a request may be ordered which may allow this information to be passed to the next layer for processing. In some examples, the Report Cache layer 410 may listen to the DC layer 404 to get the appropriate modifiers and returns back the actual data 414 after fetching it using the Common Query layer 412.

In some examples, a user 102 may input data 414 to the UI layer 406. This data 414 may be properly structured into information that is requested to be passed on the information to the Data Control layer 404 through the pageDef files of business view. The DC layer 404, through the ADF context, may get this the handle of the pageDef to which it is bound and, and may also get the requested information. For applying filters, a Filter node may be added to the pageDef file which depicts the information gathered from the user. A sample follows:

```
<Filter xmlns="http://www.beam.com/datacontrol/personalization">
    <Branch name="Root" type="ALL">
```

-continued

```
            <Node type="COLUMN">_DEPARTMENT</Node>
            <Node type="STRING">xyz</Node>
        </Entry>
    </Branch>
    <Branch type="ANY">
        <Entry type="EQ">
            <Node type="COLUMN">_DEPARTMENT</Node>
            <Node type="STRING">xyz</Node>
        </Entry>
    </Branch>
    </Branch>
</Filter>
```

In some examples, this node may not be part of the pageDef of a view in ADF. Thus, in order for it to fit into an extensible markup language (XML) file, the user of a custom namespace be implemented (e.g., highlighted in the node above). This node may then be picked up by the DC layer 404 and set in the in-memory modifier 405 to depict the changes done by the user 102 on top of the modifier that already existed for that query in the business view. When this modifier gets sent to the report cache layer 410 to return the actual data 414 back to the DC layer 404, which may in turn return the data to the UI layer 406.

Similarly, for making group changes, and making views active, the XML of a pageDef may be modified with values of new groups and a "ChangeEventPolicy" attribute may be set to "push," which may look as follows:

```
<graph IterBinding="QueryIterator" id="Query" xmlns="http://xmlns.oracle.com/adfm/dvt"
type="AREA_VERT_ABS" ChangeEventPolicy="push">
    <graphDataMap convert="false" leafOnly="true">
        <groups>
            <item value="_COUNTRY"/>
        </groups>
        <series>
            <data>
                <item value="SUM_SALARY"/>
            </data>
            <item value="_DEPARTMENT"/>
        </series>
    </graphDataMap>
</graph>
```

-continued

```
<Branch type="ANY">
    <Entry type="EQ">
        <Node type="COLUMN">_COMPONENTNAME</Node>
        <Node type="STRING">ABC</Node>
    </Entry>
        <Entry type="EQ">
```

However, this node may not be a part of the ADF framework either. As such, in some examples, it may be used as it is with changes in the group's node to depict the change in the groups done by the user 102 in the UI layer 406. Then a similar approach may be followed to return the data 414 to the UI layer 406 from the DC layer 404. Additionally, in some examples, setting up the active data properties may include the following XML, node used in the pageDef file:

```
<ActiveDataProperties xmlns="http://www.beam.com/datacontrol/activeData">
    <ActiveDataCollapse enabled="true" interval="56" timeunit="seconds"/>
    <ActiveDataWindow enabled="true" type="Fixed">
        <RangeLength timeunit="seconds">45</RangeLength>
        <UpdateInterval timeunit="seconds">34</UpdateInterval>
    </ActiveDataWindow>
</ActiveDataProperties>
```

Again, this node may not be part of the ADF framework. As such, a custom namespace may be utilized. Additionally, when the slice and dice feature changes the groups it may be internally changing the shape of the query. The structure definition inside the DC layer 404 may be based at least in part on the shape of the query. At the time the DC layer 404 gets access to the pageDef, the structure definition may already be created to the original query, so the DC layer 404 may request to modify the query definition in memory to match the new groups and also recreate dynamically the new structure definition that is expected to be bound to the pageDef that will be accessing/using this instance of the DC layer 404. Then, when the DC layer 404 opens a view on the RC layer 410, it may also use the new query definition that was modified in memory at 405. In some examples, this may ensure that the layers of the ADS 402 will be in sync.

In some examples, when a filter is applied it may change the query definition but not the shape of the query, consequently the structure definition may not change. The filter may change only the query definition in memory where a "where clause" and "parameters" of the query may change. This may get propagated to the RC layer 410 as well. If the DC layer 404 already has a view open with the previous query definition it may request the RC layer 410 to close the old view with the old query definition and open a new view on the RC layer 410 with the new query definition. Additionally, when the attribute "ChangeEventPolicy" is set to "push," the DC layer 404 may read the ActiveDataProperties node to create an appropriate ViewSetBuilder with the window extension values that is expected by the RC layer 410 when an active data push view is created. At this point the DC layer 404 may close the old tactical view on the RC layer 410 and may create a new active data definition to open a new view on the RC layer 410. After opening the new view on the RC layer 410, the DC layer 404 may register an active data listener onto the RC layer 410 for receiving delta changes. Once the RC layer 410 starts to push data in to the DC listener, the DC layer 404 may start to push data to ADF layer as well.

Further, personalization features may be implemented using a Meta Data Service (MDS) framework. A filter may be setup in a web.xml file of the application before the adfBindings filter. This filter may set up the SessionOptionsFactory which, on every page request (or a subset of the page requests), returns the customization layer which is currently active at that moment. Also at any moment a site layer may be active, but for the personalization feature the user layer may be dynamically made active. For this, an option(ModeContext) may be maintained which tells the SessionOptionsFactory that the user layer may be made active or not. Once the proper layers in the MDS framework are made active then the changes related to filters, groups and active data may be made to the pageDef files of business views which are specific for each user and whenever that pageDef is requested then the right one may be returned to the UI layer 406 and also to DC layer 404 to allow this personalization feature to work.

Figure 5:
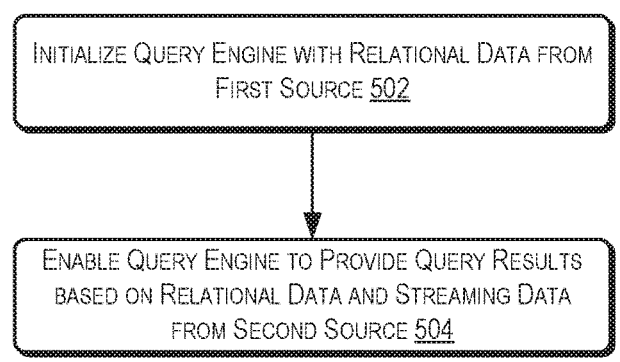
FIG. 5 is a simplified process flow illustrating at least some features of the management of the hybrid execution of continuous and scheduled queries described herein, according to at least one example.
Figure 6:
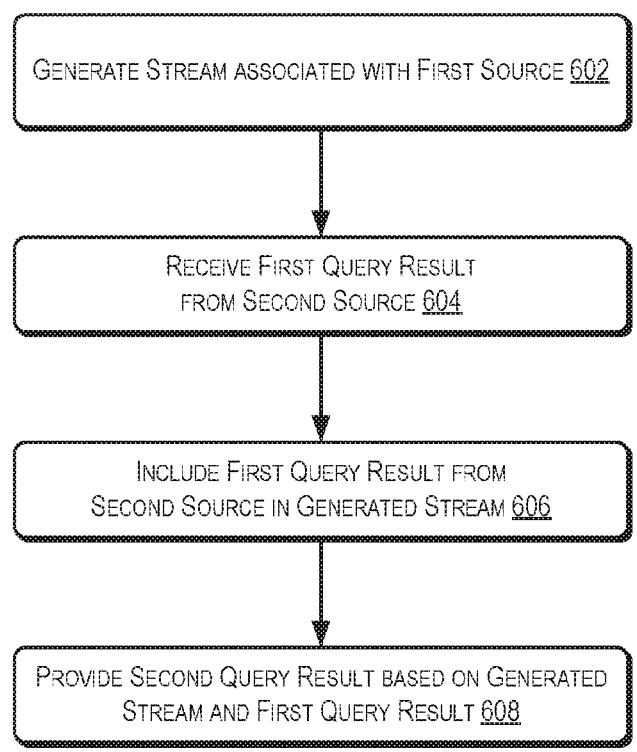
FIG. 6 is another simplified process flow illustrating at least some features of the management of the hybrid execution of continuous and scheduled queries described herein, according to at least one example.
Figure 7:
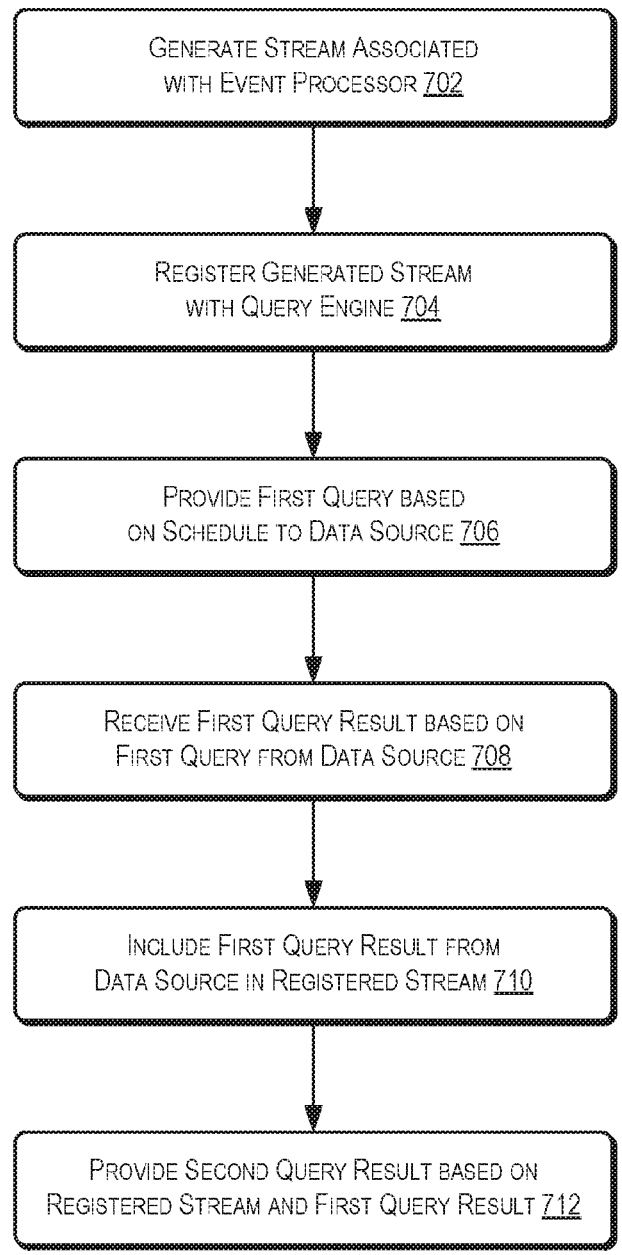
FIG. 7 is another simplified process flow illustrating at least some features of the management of the hybrid execution of continuous and scheduled queries described herein, according to at least one example.

FIGS. 5-7 illustrate example flow diagrams showing respective processes 500, 600, and 700 for implementing the hybrid execution of continuous and scheduled queries described herein. These processes 500, 600, 700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least one of the hybrid query module 148 of FIG. 1 and/or the continuous query service 206 of FIG. 2) shown in FIGS. 1-3 may perform the process 500 of FIG. 5. The process 500 may begin by including initializing a query engine with relational data from a first source at 502. In some examples, the first source may be a database (e.g., a relational database). At 504, the process 500 may end by enabling the query engine to provide query results based at least in part on the relational data and streaming data from a second source. The second source may be an event processor or other computing system capable of providing real-time and/or streaming data (e.g., complex events, KPI data, etc.).

FIG. 6 illustrates an example flow diagram showing process 600 for implementing the hybrid execution of continuous and scheduled queries described herein. The one or more service provider computers 106 (e.g., utilizing at least one of the hybrid query module 148 of FIG. 1 and/or the continuous query service 206 of FIG. 2) shown in FIGS. 1-3 may perform the process 600 of FIG. 6. The process 600 may begin at 602 by including generating a stream associated with a first source at 602. In some examples, the first source may be configured as a complex event processing engine or other event stream. At 604, the process 600 may include receiving a first query result from a second source. The second source may be configured as a database or other storage system (e.g., a relational database or the like). As such, the first query result may be received based at least in part on implementation of a tactical query. At 606, the process 600 may also include including (or providing) the first query result from the second source into the stream generated at 602. The process 600 may then end, at 608, by including providing a second query result based at least in part on the generated stream and the first query result. In other words, the second query result may be based on the inclusion of the first query result into the stream. This second query result may be provided to a user (e.g., via a user interface), to a processing engine, and/or to a service provider configured to monitor, alert, and/or provide information associated with business events or the like.

FIG. 7 illustrates an example flow diagram showing process 700 for implementing the hybrid execution of continuous and scheduled queries described herein. The one or more service provider computers 106 (e.g., utilizing at least one of the hybrid query module 148 of FIG. 1 and/or the continuous query service 206 of FIG. 2) shown in FIGS. 1-3 may perform the process 700 of FIG. 7. The process 700 may begin by including generating a stream associated with an event processor (e.g., a complex event processor or the like) at 702. At 704, the process 700 may include registering the generated stream with a query engine (e.g., the CQL engine 702 of FIG. 2). The process 700 may also include providing a first query based at least in part on a schedule to a data source at 706. The data source may be a relational database or other storage system capable of providing historical data in response to queries. At 708, the process 700 may include receiving a first query result from the data source based at least in part on the first query provided. Additionally, in some examples, the process 700 may include including the first query result from the data source in the registered stream at 710. At 712, the process 700 may end by including providing a second query result based at least in part on the registered stream and the first query result. In other words, and as noted above, the second query result may be based at least in part on a combination of the scheduled tactical query and the continuous query (i.e., instantiated by a stream).

Figure 8:
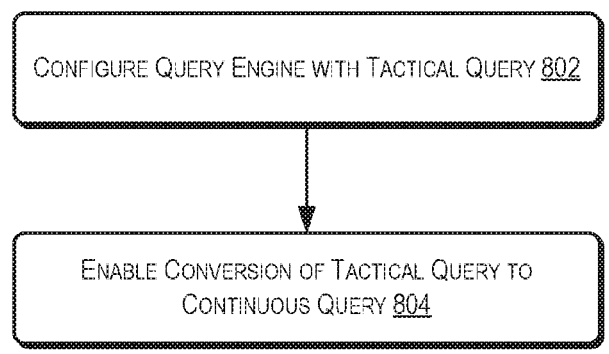
FIG. 8 is a simplified process flow illustrating at least some features of the tactical query to continuous query conversion described herein, according to at least one example.
Figure 9:
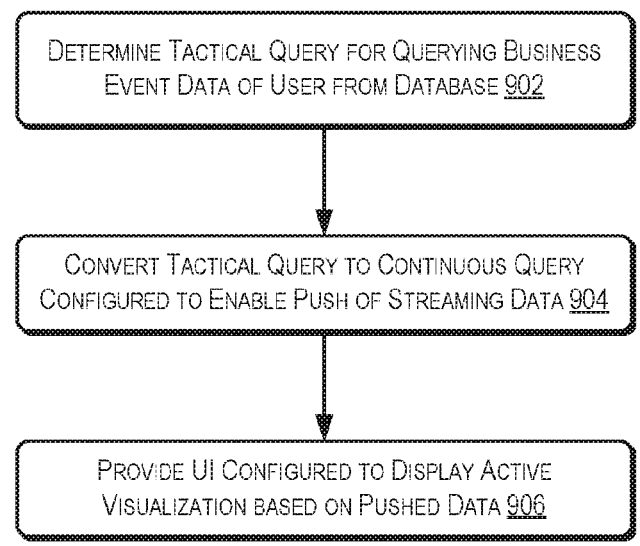
FIG. 9 is another simplified process flow illustrating at least some features of the tactical query to continuous query conversion described herein, according to at least one example.
Figure 10:
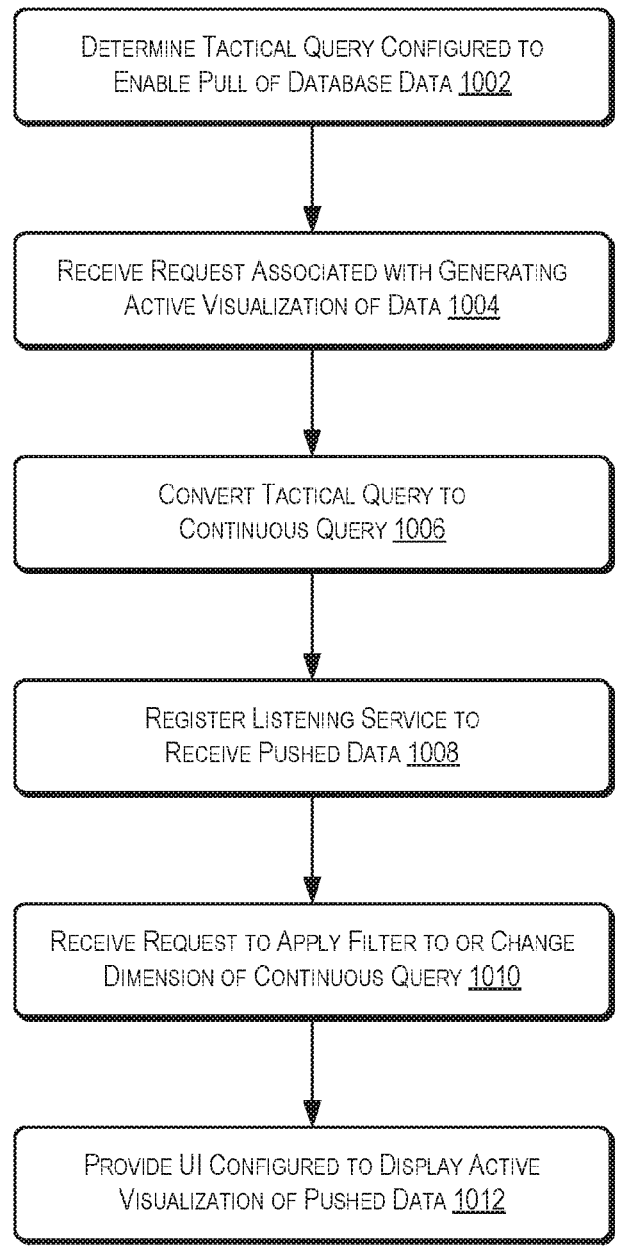
FIG. 10 is another simplified process flow illustrating at least some features of the tactical query to continuous query conversion described herein, according to at least one example.

FIGS. 8-10 illustrate example flow diagrams showing respective processes 800, 900, and 1000 for implementing the tactical query to continuous query conversion described herein. These processes 800, 900, 1000 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least one of the query conversion module 149 of FIG. 1 and/or the active data service 402 of FIG. 4) shown in FIGS. 1-4 may perform the process 800 of FIG. 8. The process 800 may begin by including configuring a query engine with a tactical query at 802. In some examples, the tactical query may be configured to pull data on behalf of the query engine. In other examples, the tactical query may be configured to enabling receipt of pulled data. At 804, the process 800 may end by including enabling conversion of a tactical query to a continuous query. In some examples, the conversion may be enabled at runtime. Additionally, in some aspects, the conversion may include at least configuring a listening service to receive data pushed from the continuous query or by the continuous query. Further, the continuous query may, instead, configure the data to be pushed from a stream to the listening service and/or the query engine.

FIG. 9 illustrates an example flow diagram showing process 900 for implementing the tactical query to continuous query conversion described herein. The one or more service provider computers 106 (e.g., utilizing at least one of the query conversion module 149 of FIG. 1 and/or the active data service 402 of FIG. 4) shown in FIGS. 1-4 may perform the process 900 of FIG. 9. The process 900 may begin at 902 by including determining a tactical query for querying business event data of a user from a database. At 904, the process 900 may include converting the tactical query to a continuous query configured to enable pushing of streaming business event data of the user to a query engine. Further, at 906, the process 900 may end by including providing a user interface configured to display the active visualization based at least in part on data pushed to the query engine.

FIG. 10 illustrates an example flow diagram showing process 1000 for implementing the tactical query to continuous query conversion described herein. The one or more service provider computers 106 (e.g., utilizing at least one of the query conversion module 149 of FIG. 1 and/or the active data service 402 of FIG. 4) shown in FIGS. 1-4 may perform the process 1000 of FIG. 10. The process 1000 may begin by including determining a tactical query configured to enable pulling business event data from a database to a query engine at 1002. The determination may be based at least in part on a query received from a user. At 1004, the process 1000 may include receiving a request associated with generating an active visualization of the data. The process 1000 may also convert the tactical query into a continuous query at 1006. The conversion may take place at runtime. At 1008, the process 1000 may include registering a listening service to receive pushed data (e.g., from a stream). At 1010, the process 1000 may receive a request to apply a filter to or change dimension of the continuous query (e.g., at runtime). Further, the process 1000 may end at 1012, where the process 1000 may include providing a UI configured to display the active visualization of the pushed data.

Illustrative methods and systems for implementing the hybrid execution of continuous and scheduled queries are described above. Some or all of these systems and methods may, but need not, be implemented at least partially by architectures and processes such as those shown at least in FIGS. 1-10 above.

Figure 11:
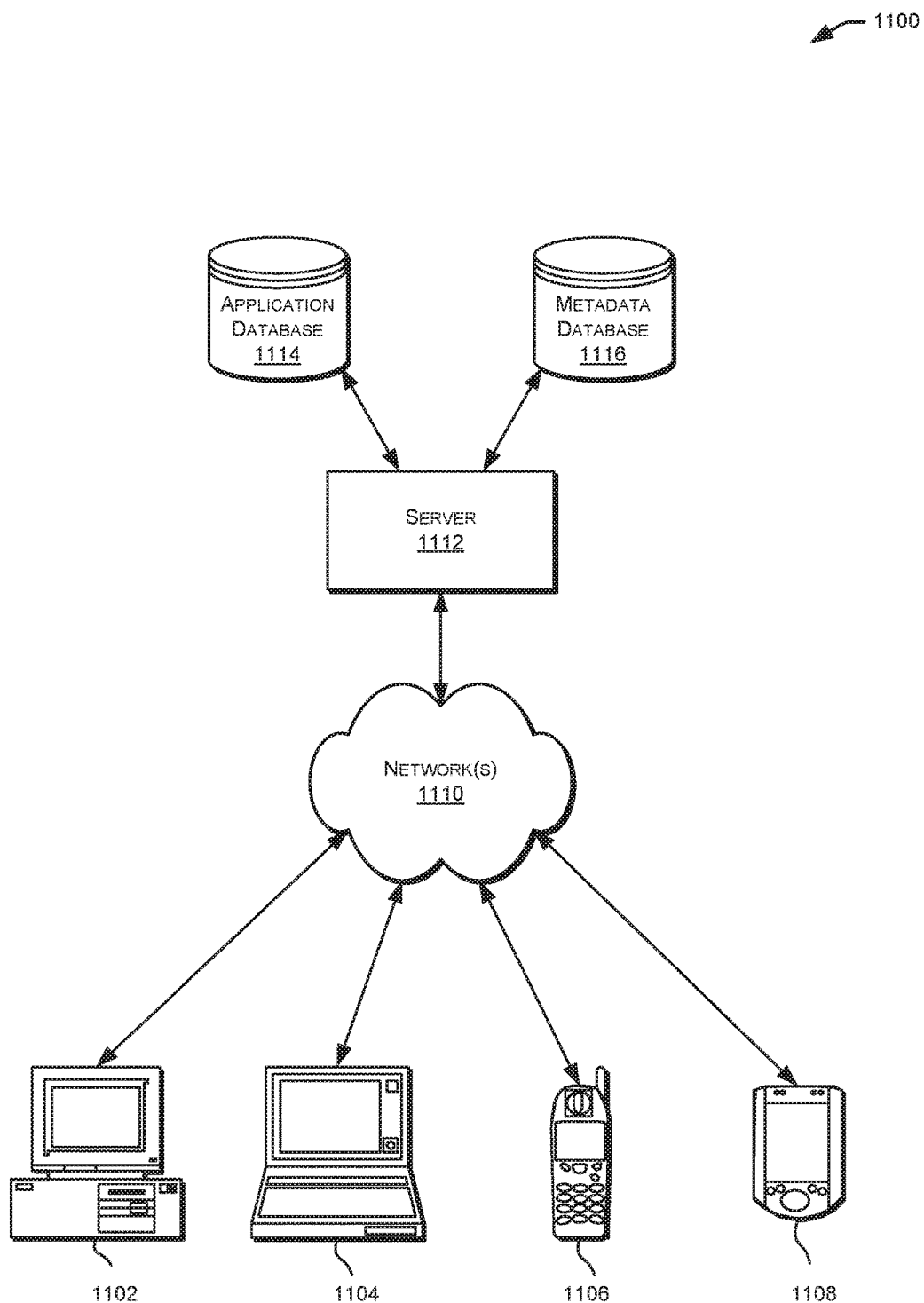
FIG. 11 is a simplified block diagram illustrating components of a system environment that may be used in accordance with an embodiment of the management of the hybrid execution of continuous and scheduled queries described herein, according to at least one example.

FIG. 11 is a simplified block diagram illustrating components of a system environment 1100 that may be used in accordance with an embodiment of the present disclosure. As shown, system environment 1100 includes one or more client computing devices 1102, 1104, 1106, 1108, which are configured to operate a client application such as a web browser, proprietary client (e.g., Oracle Forms), or the like over one or more networks 1110 (such as, but not limited to, networks similar to the networks 108 of FIGS. 1 and 3). In various embodiments, client computing devices 1102, 1104, 1106, and 1108 may interact with a server 1112 over the networks 1110.

Client computing devices 1102, 1104, 1106, 1108 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIXlike operating systems (including without limitation the variety of GNU/Linux operating systems). Alternatively, client computing devices 1102, 1104, 1106, and 1108 may be any other electronic device, such as a thin-client computer, Internet-enabled gaming system, and/or personal messaging device, capable of communicating over a network (e.g., network 1110 described below). Although exemplary system environment 1100 is shown with four client computing devices, any number of client computing devices may be supported. Other devices such as devices with sensors, etc. may interact with server 1112.

System environment 1100 may include networks 1110. Networks 1110 may be any type of network familiar to those skilled in the art that can support data communications using any of a variety of commercially-available protocols, including without limitation TCP/IP, SNA, IPX, AppleTalk, and the like. Merely by way of example, network 1110 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1100 also includes one or more server computers 1112 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 1100 may also include one or more databases 1114, 1116. Databases 1114, 1116 may reside in a variety of locations. By way of example, one or more of databases 1114, 1116 may reside on a non-transitory storage medium local to (and/or resident in) server 1112. Alternatively, databases 1114, 1116 may be remote from server 1112, and in communication with server 1112 via a network-based or dedicated connection. In one set of embodiments, databases 1114, 1116 may reside in a storage-area network (SAN) familiar to those skilled in the art. Similarly, any necessary files for performing the functions attributed to server 1112 may be stored locally on server 1112 and/or remotely, as appropriate. In one set of embodiments, databases 1114, 1116 may include relational databases, such as databases provided by Oracle, that are adapted to store, update, and retrieve data in response to SQL-formatted commands.

Figure 12:
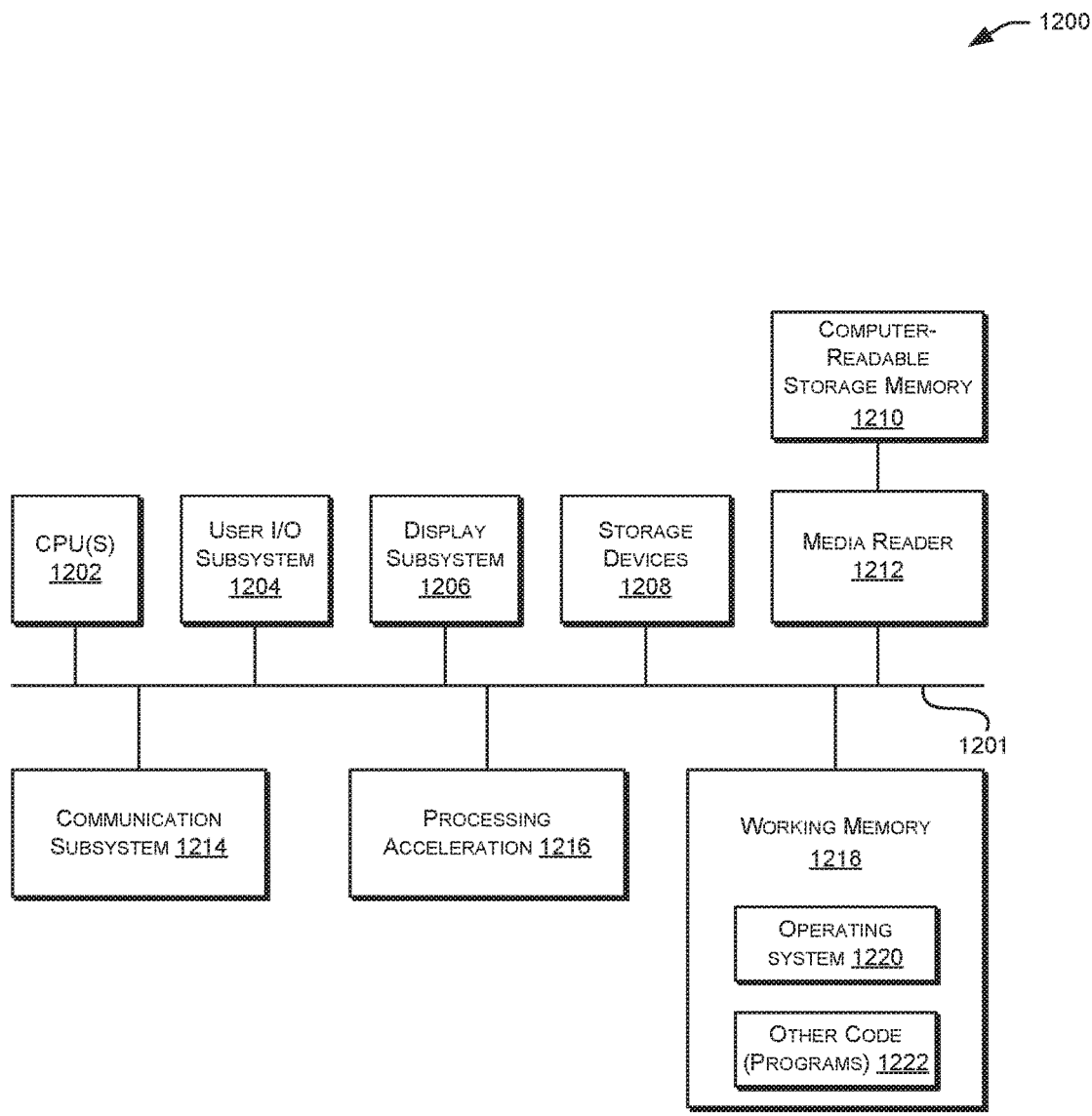
FIG. 12 is a simplified block diagram illustrating a computer system that may be used in accordance with embodiments of the management of the hybrid execution of continuous and scheduled queries described herein described herein, according to at least one example.

FIG. 12 is a simplified block diagram of a computer system 1200 that may be used in accordance with embodiments of the present disclosure. For example service provider computers 106 may be implemented using a system such as system 1200. Computer system 1200 is shown comprising hardware elements that may be electrically and/or communicatively coupled via a bus 1201. The hardware elements may include one or more central processing units (CPUs) 1202, one or more input devices 1204 (e.g., a mouse, a keyboard, etc.), and one or more output devices 1206 (e.g., a display device, a printer, etc.). Computer system 1200 may also include one or more storage devices 1208. By way of example, the storage device(s) 1208 may include devices such as disk drives, optical storage devices, and solid-state storage devices such as a random access memory (RAM) and/or a read-only memory (ROM), which can be programmable, flash-updateable and/or the like.

Computer system 1200 may additionally include a computer-readable storage media reader 1212, a communications subsystem 1214 (e.g., a modem, a network card (wireless or wired), an infra-red communication device, etc.), and working memory 1218, which may include RAM and ROM devices as described above. In some embodiments, computer system 1200 may also include a processing acceleration unit 1216, which can include a digital signal processor (DSP), a special-purpose processor, and/or the like.

Computer-readable storage media reader 1212 can further be connected to a computer-readable storage medium 1210, together (and, optionally, in combination with storage device(s) 1208) comprehensively representing remote, local, fixed, and/or removable storage devices plus storage media for temporarily and/or more permanently containing computer-readable information. Communications system 1214 may permit data to be exchanged with network 1212 and/or any other computer described above with respect to system environment 1200.

Computer system 1200 may also comprise software elements, shown as being currently located within working memory 1218, including an operating system 1220 and/or other code 1222, such as an application program (which may be a client application, Web browser, mid-tier application, RDBMS, etc.). In an exemplary embodiment, working memory 1218 may include executable code and associated data structures used for relying party and open authorization-related processing as described above. It should be appreciated that alternative embodiments of computer system 1200 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to, volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-12 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:
a memory storing a plurality of instructions; and
one or more processors configured to access the memory, wherein the one or more processors are further configured to execute the plurality of instructions to at least:
execute a hybrid query for combining a continuous query and a scheduled database query, the hybrid query refreshed based at least in part on a schedule;
generate a stream associated with an event processor configured to provide real-time data;
initialize a query engine with relational data from a relational database, wherein the query engine is configured to provide a query result based at least in part on the relational data and streaming data from a second data source;
provide a tactical query configured to pull data elements from the relational database based at least in part on a timer;
receive, from the relational database, a relational query result based at least in part on the scheduled database query, the scheduled database query being provided to a scheduler of the relational database, and the scheduler configured to perform the scheduled database query on the relational database based at least in part on the schedule;
include the relational data from the relational query result in the generated stream by automatically pushing the relational data to the continuous query;
enable the query engine to provide a continuous query result; and
provide a user interface configured to display a visualization based at least in part on the continuous query result.

2. The system of claim 1, wherein the continuous query is configured to query the stream.

3. The system of claim 1, wherein the continuous query result is enabled to be provided to the query engine based at least in part on an event of the stream received by the query engine.

4. The system of claim 3, wherein the continuous query result is enabled to be provided to the query engine based at least in part on an event of the stream received by the query engine.

5. The system of claim 3, wherein enabling the query engine to provide the continuous query result comprises at least joining the relational data and the streaming events.

6. The system of claim 1, wherein enabling the query engine to provide the continuous query result comprises at least providing a second query that comprises the relational data to a continuous query language engine.

7. The system of claim 6, wherein enabling the query engine to provide the continuous query result includes at least receiving the continuous query result from the continuous query language engine based at least in part on the scheduled database query that includes the relational data.

8. A computer-readable memory storing a plurality of instructions executable by one or more processors, the plurality of instructions comprising:
instructions that cause the one or more processors to execute a hybrid query for combining a continuous query and a scheduled database query, the hybrid query refreshed based at least in part on a schedule;
instructions that cause the one or more processors to generate a stream associated with an event processor configured to provide real-time data;
instructions that cause the one or more processors to initialize a query engine with relational data from a relational database, wherein the query engine is configured to provide a query result based at least in part on the relational data and streaming data from a second data source;
instructions that cause the one or more processors to provide a tactical query configured to pull data elements from the relational database based at least in part on a timer;
instructions that cause the one or more processors to receive, from the relational database, a relational query result based at least in part on the scheduled database query, the scheduled database query being provided to a scheduler of the relational database, and the scheduler configured to perform the scheduled database query on the relational database based at least in part on the schedule;
instructions that cause the one or more processors to include the relational data from the relational query result in the generated stream by automatically pushing the relational data to the continuous query;

instructions that cause the one or more processors to enable the query engine to provide a continuous query result; and instructions that cause the one or more processors to provide a user interface configured to display a visualization based at least in part on the continuous query result.

9. The computer-readable memory of claim 8, wherein the stream is generated based at least in part on a data definition language.

10. The computer-readable memory of claim 8, wherein the stream is configured to operate with an event processing engine.

11. The computer-readable memory of claim 8, wherein the continuous query is configured to query the stream.

12. The computer-readable memory of claim 9, wherein the continuous query result is enabled to be provided to the query engine based at least in part on an event of the stream received by the query engine.

13. The computer-readable memory of claim 8, wherein the continuous query result is enabled to be provided to the query engine based at least in part on an event of the stream received by the query engine.

14. A computer-implemented method, comprising:

executing a hybrid query for combining a continuous query and a scheduled database query, the hybrid query refreshed based at least in part on a schedule;

generating a stream associated with an event processor configured to provide real-time data;

initializing a query engine with relational data from a relational database, wherein the query engine is configured to provide a query result based at least in part on the relational data and streaming data from a second data source;

provide a tactical query configured to pull data elements from the relational database based at least in part on a timer;

receiving, from the relational database, a relational query result based at least in part on the scheduled database query, the scheduled database query being provided to a scheduler of the relational database, and the scheduler configured to perform the scheduled database query on the relational database based at least in part on the schedule;

including the relational data from the relational database in the generated stream by automatically pushing the relational data to the continuous query;

enabling the query engine to provide a continuous query result; and providing a user interface configured to display a visualization based at least in part on the continuous query result.

15. The computer-implemented method of 14, wherein the query engine is configured based at least in part on a continuous query language.

16. The computer-implemented method of claim 14, wherein the relational database includes at least historical performance indicators.

17. The computer-implemented method of claim 14, wherein the continuous query result is enabled to be provided to the query engine based at least in part on an event of the stream received by the query engine.

18. The computer-implemented method of claim 14, wherein the continuous query result is enabled to be provided to the query engine based at least in part on an event of the stream received by the query engine.

19. The computer-implemented method of claim 14, wherein including the relational query result from the relational database in the stream comprises at least generating the stream to include an identifier associated with the relational query result.

* * * * *

UNITED STATES PATENT AND TRADEMARK OFFICE
CERTIFICATE OF CORRECTION

PATENT NO. : 9,715,529 B2
APPLICATION NO. : 15/003646
DATED : July 25, 2017
INVENTOR(S) : Park et al.

Page 1 of 2

It is certified that error appears in the above-identified patent and that said Letters Patent is hereby corrected as shown below:

On the Title Page

On page 5, Column 2, under Other Publications, Line 6, delete "$22_{nd}$" and insert -- $22^{nd}$ --, therefor.

On page 6, Column 1, under Other Publications, Line 13, delete "Patentabiilty" and insert -- Patentability --, therefor.

On page 7, Column 1, under Other Publications, Line 21, delete "SqiDataSource" and insert -- SqlDataSource --, therefor.

On page 7, Column 1, under Other Publications, Line 30, delete "retreived" and insert -- retrieved --, therefor.

On page 7, Column 2, under Other Publications, Line 14, delete "SIGMOD-SIGACT-SIDART" and insert -- SIGMOD-SIGACT-SIGART --, therefor.

On page 8, Column 1, under Other Publications, Line 32, delete "Diad" and insert -- Diao --, therefor.

On page 9, Column 1, under Other Publications, Line 35, delete "KRÄAMER," and insert -- KRÄMER, --, therefor.

On page 10, Column 1, under Other Publications, Line 36, delete "Postgressql," and insert -- Postgresql, --, therefor.

On page 10, Column 1, under Other Publications, Line 36, delete "PostgresSQL" and insert -- PostgreSQL --, therefor.

On page 10, Column 2, under Other Publications, Line 20, delete "Integrationand" and insert -- Integration and --, therefor.

Signed and Sealed this
Thirteenth Day of March, 2018

Andrei Iancu
*Director of the United States Patent and Trademark Office*

CERTIFICATE OF CORRECTION (continued)
U.S. Pat. No. 9,715,529 B2

On page 12, Column 2, under Other Publications, Line 1, delete "Actio" and insert -- Action --, therefor.

In the Claims

In Column 25, Line 19, in Claim 12, delete "claim 9," and insert -- claim 8, --, therefor.

In Column 26, Line 18, in Claim 15, delete "of" and insert -- of claim --, therefor.